United States Patent
Negus et al.

(10) Patent No.: US 8,300,590 B1
(45) Date of Patent: Oct. 30, 2012

(54) INTELLIGENT BACKHAUL SYSTEM

(75) Inventors: Kevin J. Negus, Hyattville, WY (US); Kevin J. Duffy, Los Gatos, CA (US)

(73) Assignee: CBF Networks, Inc., San Jose, CA (US)

( * ) Notice: Subject to any disclaimer, the term of this patent is extended or adjusted under 35 U.S.C. 154(b) by 0 days.

(21) Appl. No.: 13/415,778

(22) Filed: Mar. 8, 2012

Related U.S. Application Data

(63) Continuation of application No. 13/271,051, filed on Oct. 11, 2011.

(51) Int. Cl.
*H04W 4/00* (2009.01)
(52) U.S. Cl. .................................. 370/329; 455/422.1
(58) Field of Classification Search .................. 370/329, 370/235, 347, 503; 455/11.1
See application file for complete search history.

(56) References Cited

U.S. PATENT DOCUMENTS

| | | | |
|---|---|---|---|
| 5,604,744 A * | 2/1997 | Andersson et al. ........... 370/347 |
| 5,809,422 A | 9/1998 | Raleigh et al. |
| 6,463,303 B1 | 10/2002 | Zhao |
| 6,486,828 B1 | 11/2002 | Cahn et al. |
| 6,912,195 B2 | 6/2005 | Vook et al. |
| 6,985,123 B2 | 1/2006 | Gottl |
| 7,027,837 B1 | 4/2006 | Uhlik et al. |
| 7,171,223 B2 | 1/2007 | Herscovich et al. |
| 7,221,722 B2 | 5/2007 | Thomas et al. |
| 7,292,663 B1 | 11/2007 | Van Wechel et al. |
| 7,394,439 B1 | 7/2008 | Johnson et al. |
| 7,403,501 B2 | 7/2008 | Bordonaro et al. |
| 7,587,177 B1 | 9/2009 | Kwong |
| 7,593,729 B2 | 9/2009 | Barak et al. |
| 7,599,290 B2 | 10/2009 | Dos Remedios et al. |
| 7,616,554 B2 | 11/2009 | Asai et al. |
| 7,620,370 B2 | 11/2009 | Barak et al. |
| 7,756,519 B2 | 7/2010 | Barak et al. |
| 7,848,241 B2 | 12/2010 | Natarajan et al. |
| 7,948,942 B2 | 5/2011 | Zhang et al. |
| 8,238,318 B1 | 8/2012 | Negus |
| 2001/0030939 A1 | 10/2001 | Vijayan et al. |
| 2002/0060993 A1 | 5/2002 | Dent |
| 2004/0165650 A1 | 8/2004 | Miyazaki et al. |
| 2005/0026616 A1 | 2/2005 | Cavalli et al. |
| 2005/0075078 A1 | 4/2005 | Makinen et al. |
| 2006/0141929 A1 * | 6/2006 | Lockie et al. ................ 455/11.1 |
| 2006/0164271 A1 | 7/2006 | Hirt et al. |
| 2008/0080364 A1 | 4/2008 | Barak et al. |
| 2008/0240307 A1 | 10/2008 | Wang et al. |
| 2008/0242232 A1 | 10/2008 | Zavadsky et al. |
| 2009/0010238 A1 | 1/2009 | Barak et al. |

(Continued)

OTHER PUBLICATIONS

Notice of Allowance in U.S. Appl. No. 13/212,036, mailed Apr. 3, 2012.

(Continued)

*Primary Examiner* — Robert Wilson
*Assistant Examiner* — Lionel Preval
(74) *Attorney, Agent, or Firm* — Nixon Peabody LLP

(57) ABSTRACT

A intelligent backhaul system is disclosed to manage and control multiple intelligent backhaul radios within a geographic zone. The intelligent backhaul system includes multiple intelligent backhaul radios (IBRs) that are able to function in both obstructed and unobstructed line of sight propagation conditions, one or more intelligent backhaul controllers (IBCs) connecting the IBRs with other network elements, and an intelligent backhaul management system (IBMS). The IBMS may include a private and/or public server and/or agents in one or more IBRs or IBCs.

27 Claims, 7 Drawing Sheets

U.S. PATENT DOCUMENTS

| | | |
|---|---|---|
| 2009/0052411 A1 | 2/2009 | Leung et al. |
| 2009/0067526 A1 | 3/2009 | Ratermann et al. |
| 2009/0143017 A1 | 6/2009 | Barak et al. |
| 2009/0274130 A1 | 11/2009 | Boch |
| 2009/0323621 A1 | 12/2009 | Touboul et al. |
| 2010/0056205 A1 | 3/2010 | Fuss |
| 2010/0157970 A1 | 6/2010 | Gotman et al. |
| 2010/0272006 A1 | 10/2010 | Bertrand et al. |
| 2011/0044279 A1 | 2/2011 | Johansson et al. |
| 2011/0070855 A1 | 3/2011 | Mariotti |
| 2011/0235514 A1* | 9/2011 | Huang et al. ............. 370/235 |
| 2012/0063472 A1* | 3/2012 | Le Pallec et al. ......... 370/503 |

OTHER PUBLICATIONS

"AccessGate—RAN Optimization for Mobile Backhaul Systems," Product Data Sheet, Memotec, 2009, Montreal, Quebec, Canada, 2 pages.

"Advances in Backhaul Synchronization—Maximizing ROI," Application Brief, Symmetricom Inc., 2008, 6 pages.

Beller, D. et al., "MPLS-TP—The New Technology for Packet Transport Networks," Alcatel-Lucent Deutschland AG, Stuttgart, 2009, 11 pages.

"Carrier Ethernet Services Overview," Presentation, MEF, Aug. 2008, 32 pages.

Chundury, R., "Mobile Broadband Backhaul: Addressing the Challenge," Planning Backhaul Networks, Ericsson Review, 2008, pp. 4-9.

"Clock Distribution and Synchronization over Ethernet: IEEE1588v2 and SyncE," Presentation, VITESSE, Sep. 2009, 9 pages.

"Evolving Microwave Mobile Backhaul for Next-Generation Networks," White Paper, NEC Corp., Feb. 2008, 4 pages.

Frost, D. et al., "MPLS Transport Profile Data Plane Architecture," Internet Engineering Task Force, RFC 5960, Aug. 2010, 16 pages.

Garner, G. M., "IEEE 1588 Version 2," ISPCS Ann Arbor '08, Sep. 2008, 89 pages.

"IEEE 1588v2 (Precision Time Protocol) Testing," Application Note, IXIA, Dec. 2009, 12 pages.

"Understanding MPLS-TP and Its Benefits," White Paper, Cisco Systems Inc., 2009, 9 pages.

"Using OAM for Efficient and Cost-Effective Ethernet Backhaul Network Management," Application Note 229, EXFO Inc., Quebec City, Canada, 2010, 4 pages.

United States Federal Communications Commission (FCC) website: http://www.fcc.gov/; accessed Oct. 12, 2011.

OpenFlow website: http://www.openflow.org/; accessed Oct. 12, 2011.

U.S. Appl. No. 13/212,036, filed Aug. 17, 2011.

U.S. Appl. No. 13/271,051, filed Oct. 12, 2011.

U.S. Appl. No. 13/371,346, filed Feb. 10, 2012.

U.S. Appl. No. 13/371,366, filed Feb. 10, 2012.

"WiMAX/BWA/WiBRO/LTE RF MxFE 2x2 MIMO Transceiver, AD9356," Data Sheet, Analog Devices, 2010.

"WiMAX/BWA/LTE RF MxFE 2x2 MIMO Transceiver, AD9357," Data Sheet, Analog Devices, 2010.

"WiMAX/WiBro RF MxFE MISO Transceiver, AD9354," Data Sheet, Analog Devices, 2008-2009.

"WiMAX/WiBro RF MxFE MISO Transceiver, AD9355," Data Sheet, Analog Devices, 2008-2009.

"WiMAX RF MxFE Transceiver, AD9352-5," Data Sheet, Analog Devices, 2008.

"WiMAX RF MxFE Transceiver, AD9353," Data Sheet, Analog Devices, 2007.

"WiMAX/WiBro RF MxFE Transceiver, AD9352," Data Sheet, Analog Devices, 2007.

"MGA-645T6—Low Noise Amplifier with Bypass/Shutdown Mode in Low Profile Package," Data Sheet, Avago Technologies, Nov. 2009, 16 pages.

"MGA-655T—Low Noise Amplifier with Bypass Mode in Low Profile Package," Data Sheet, Avago Technologies, Nov. 2009, 14 pages.

"MGA-675T6—Low Noise Amplifier with Shutdown Mode in Low Profile Package for 4.9—6 GHz Application," Data Sheet, Avago Technologies, Nov. 2009, 16 pages.

"MGA-21108—Broadband Fully Integrated Matched Low-Noise Amplifier MMIC," Data Sheet, Avago Technologies, Aug. 2009, 21 pages.

"MGA-22003—2.3-2.7 GHz 3x3mm WiMAX/WiBro and WiFi Linear Amplifier Module," Data Sheet, Avago Technologies, Mar. 2010, 15 pages.

"MGA-23003—3.3-3.8 GHz 3x3mm WiMAX Power Amplifier," Data Sheet, Avago Technologies, Mar. 2010, 16 pages.

"MGA-25203—5.1-5.9GHz 3x3mm WiFi and WiMAX Power Amplifier," Data Sheet, Avago Technologies, Mar. 2010, 14 pages.

MGA-43328—(2.5-2.7) GHz 29dBm High Linearity Wireless Data Power Amplifier, Data Sheet, Avago Technologies, Mar. 2010, 19 pages.

"MGA-43328—High Linearity Wireless Data Power Amplifier for 2.5 to 2.7 GHz Applications," Data Sheet, Avago Technologies, Apr. 2010, 10 pages.

Baum, D. S. et al., "An Interim Channel Model for Beyond-3G Systems—Extending the 3GPP Spatial Channel Model (SCM)," IEEE, Vehicular Technology Conference, vol. 5, 2005, pp. 3132-3136.

Conrat, J-M. et al., "Typical MIMO Propagation Channels in Urban Macrocells at 2 GHz," EURASIP Journal on Wireless Communications and Networking, vol. 2007, Iss. 2, Jan. 2007, 9 pages.

Coon, J. P. et al., "Adaptive Frequency-Domain Equalization for Single-Carrier Multiple-Input Multiple-Output Wireless Transmissions," IEEE Transactions on Signal Processing, vol. 53, No. 8, Aug. 2005, pp. 3247-3256.

Coon, J. P. et al., "An Investigation of MIMO Single-Carrier Frequency-Domain MMSE Equalization," Centre for Communications Research, University of Bristol, Sep. 2002, 4 pages.

"DAN2400-PTP—Open SoC Platform for Sub-6GHz Wireless Point-to-Point Systems," DesignArt Networks, Jul. 2008, 2 pages.

Durgin, G. D., "Wideband Measurements of Angle and Delay Dispersion for Outdoor and Indoor Peer-to-Peer Radio Channels at 1920 MHz," IEEE Transactions on Antennas and Propagation, vol. 51, No. 5, May 2003, pp. 936-944.

Falconer, D. D. et al., "Broadband Wireless Using Single Carrier and Frequency Domain Equalization," Invited Overview Paper for WPMC '02, Honolulu, Oct. 2002, 10 pages.

Falconer, D. D. et al., "Frequency Domain Equalization for Single-Carrier Broadband Wireless Systems," Wideband Wireless Access Technologies to Broadband Internet, IEEE Communications Magazine, Apr. 2002, pp. 58-66.

"GainSpan GS1011M Low Power Wi-Fi® Module Family," Product Brief—Preliminary, GainSpan Corp., 2009, 2 pages.

Hentschel, T. et al., "The Digital Front-End—Bridge Between RF and Baseband-Processing," Software Defined Radio: Enabling Technologies by Walter Tuttlebee, Chapter 6, Jun. 2002, 58 pages.

"HMC536MS8G / 536MS8GE—GaAs MMIC Positive Control T/R Switch, DC—6 GHz," Data Sheet, Switches-SMT, Hittite Microwave Corp., 2008, pp. 10.295-10.299.

"Part 11: Wireless LAN Medium Access Control (MAC) and Physical Layer (PHY) Specifications—Amendment 5: Enhancements for Higher Throughput," IEEE Standard for Information Technology—Telecommunications and Information Exchange Between Systems—Local and Metropolitan Area Networks—Specific Requirements, IEEE Computer Society, IEEE Std 802.11, Sep. 2009, 536 pages.

"Part 11: Wireless LAN Medium Access Control (MAC) and Physical Layer (PHY) Specifications," IEEE Standard for Information Technology—Telecommunications and Information Exchange Between Systems—Local and Metropolitan Area Networks—Specific requirements, IEEE Computer Society, IEEE Std 802.11, Jun. 2007, 1233 pages.

"Part 16: Air Interface for Fixed Broadband Wireless Access Systems," IEEE Standard for Local and Metropolitan Area Networks, IEEE Std 802.16, IEEE Computer Society and the IEEE Microwave Theory and Techniques Society, Oct. 2004, 895 pages.

"Part 16: Air Interface for Fixed and Mobile Broadband Wireless Access Systems—Amendment 2: Physical and Medium Access Control Layers for Combined Fixed and Mobile Operation in Licensed Bands and Corrigendum 1," IEEE Standard for Local and Metropolitan Area Networks, IEEE Computer Society and the IEEE Microwave Theory and Techniques Society, IEEE Std 802.16e-2005 and IEEE Std 802.16-2004/Corl-2005, Feb. 2006, 864 pages.

"Information Technology—Open Systems Interconnection—Basic Reference Model: The Basic Model," International Standard, ISO/IEC 7498-1, Second Edition Nov. 15, 1994, Corrected and Reprinted Jun. 15, 1996, 68 pages.

"SC-FDMA—Single Carrier FDMA in LTE," Data Sheet, IXIA Corp., Nov. 2009, 16 pages.

"Clock Synchronization in Carrier Ethernet Networks—Synchronous Ethernet and 1588v2 on Juniper Networks MX Series 3D Universal Edge Routers," White Paper, Juniper Networks, Inc., 2010, 11 pages.

Lashkarian, N., "Reconfigurable Digital Front-end Architecture for Wireless Base-Station Transmitters: Analysis, Design and FPGA Implementation," Seminar Presentation, University of California, Berkeley, Apr. 2006, 86 pages.

Padhi, S. K. et al., "A Dual Polarized Aperture Coupled Circular Patch Antenna Using a C-Shaped Coupling Slot," IEEE Transactions on Antennas and Propagation, vol. 51, No. 12, Dec. 2003, pp. 3295-3298.

Pancaldi, F. et al., "Single-Carrier Frequency Domain Equalization—A Focus on Wireless Applications," IEEE Signal Processing Magazine, Sep. 2008, 22 pages.

"PC203-PC203-10—Basestation PHY Processor," Wireless Communications Processors, Product Brief, picoChip Flexible Wireless, 2008, 4 pages.

Nathanzon, G. et al., "Cost-Effective Backhaul Alternatives for WiMAX Networks: Challenges & Solutions," Provigent Inc., Jun. 2008, 16 pages.

Soffer, R., "Microwave Wireless Backhaul for LTE Networks—Meeting the Rapidly-Increasing Demand for Mobile Data," Provigent Inc., Jan. 2010, 18 pages.

Soffer, R., "ProviBand—Next Generation Wireless Backhaul Technology," Technical White Paper, Provigent Inc., Jan. 2006, 13 pages.

"Doubling Capacity in Wireless Channels," Provigent Inc., 2008, 3 pages.

Sharony, J., "Introduction to Wireless MIMO—Theory and Applications," CEWIT—Center of Excellence in Wireless and Informational Technology, Stony Brook University, IEEE LI, Nov. 15, 2006, 63 pages.

Stüber, G. L., et al., "Broadband MIMO-OFDM Wireless Communications," Invited Paper, Proceedings of the IEEE, vol. 92, No. 2, Feb. 2004, pp. 271-294.

Tubbax, J., "OFDM Versus Single Carrier with Cyclic Prefix: A System-based Comparison for Binary Modulation," IMEC, Belgium, Jan. 2011, 4 pages.

Office Action in U.S. Appl. No. 13/371,366, mailed Apr. 19, 2012.
U.S. Appl. No. 13/448,294, filed Apr. 16, 2012.
Office Action in U.S. Appl. No. 13/448,294, mailed on Jun. 21, 2012.
U.S. Appl. No. 13/536,927, filed Jun. 28, 2012.

* cited by examiner

INTELLIGENT BACKHAUL SYSTEM

CROSS-REFERENCE TO RELATED APPLICATION

The present application is a continuation application of U.S. patent application Ser. No. 13/271,051, filed on Oct. 11, 2011, and the disclosure of which is hereby incorporated herein by reference in its entirety.

BACKGROUND

1. Field

The present disclosure relates generally to data networking and in particular to a backhaul system to manage and control multiple backhaul radios that connect remote edge access networks to core networks in a geographic zone.

2. Related Art

Data networking traffic has grown at approximately 100% per year for over 20 years and continues to grow at this pace. Only transport over optical fiber has shown the ability to keep pace with this ever-increasing data networking demand for core data networks. While deployment of optical fiber to an edge of the core data network would be advantageous from a network performance perspective, it is often impractical to connect all high bandwidth data networking points with optical fiber at all times. Instead, connections to remote edge access networks from core networks are often achieved with wireless radio, wireless infrared, and/or copper wireline technologies.

Radio, especially in the form of cellular or wireless local area network (WLAN) technologies, is particularly advantageous for supporting mobility of data networking devices. However, cellular base stations or WLAN access points inevitably become very high data bandwidth demand points that require continuous connectivity to an optical fiber core network.

When data aggregation points, such as cellular base station sites, WLAN access points, or other local area network (LAN) gateways, cannot be directly connected to a core optical fiber network, then an alternative connection, using, for example, wireless radio or copper wireline technologies, must be used. Such connections are commonly referred to as "backhaul."

Many cellular base stations deployed to date have used copper wireline backhaul technologies such as T1, E1, DSL, etc. when optical fiber is not available at a given site. However, the recent generations of HSPA+ and LTE cellular base stations have backhaul requirements of 100 Mb/s or more, especially when multiple sectors and/or multiple mobile network operators per cell site are considered. WLAN access points commonly have similar data backhaul requirements. These backhaul requirements cannot be practically satisfied at ranges of 300 m or more by existing copper wireline technologies. Even if LAN technologies such as Ethernet over multiple dedicated twisted pair wiring or hybrid fiber/coax technologies such as cable modems are considered, it is impractical to backhaul at such data rates at these ranges (or at least without adding intermediate repeater equipment). Moreover, to the extent that such special wiring (i.e., CAT 5/6 or coax) is not presently available at a remote edge access network location; a new high capacity optical fiber is advantageously installed instead of a new copper connection.

Rather than incur the large initial expense and time delay associated with bringing optical fiber to every new location, it has been common to backhaul cell sites, WLAN hotspots, or LAN gateways from offices, campuses, etc. using microwave radios. An exemplary backhaul connection using the microwave radios 132 is shown in FIG. 1. Traditionally, such microwave radios 132 for backhaul have been mounted on high towers 112 (or high rooftops of multi-story buildings) as shown in FIG. 1, such that each microwave radio 132 has an unobstructed line of sight (LOS) 136 to the other. These microwave radios 132 can have data rates of 100 Mb/s or higher at unobstructed LOS ranges of 300 m or longer with latencies of 5 ms or less (to minimize overall network latency).

Traditional microwave backhaul radios 132 operate in a Point to Point (PTP) configuration using a single "high gain" (typically >30 dBi or even >40 dBi) antenna at each end of the link 136, such as, for example, antennas constructed using a parabolic dish. Such high gain antennas mitigate the effects of unwanted multipath self-interference or unwanted co-channel interference from other radio systems such that high data rates, long range and low latency can be achieved. These high gain antennas however have narrow radiation patterns.

Furthermore, high gain antennas in traditional microwave backhaul radios 132 require very precise, and usually manual, physical alignment of their narrow radiation patterns in order to achieve such high performance results. Such alignment is almost impossible to maintain over extended periods of time unless the two radios have a clear unobstructed line of sight (LOS) between them over the entire range of separation. Furthermore, such precise alignment makes it impractical for any one such microwave backhaul radio to communicate effectively with multiple other radios simultaneously (i.e., a "point to multipoint" (PMP) configuration).

In wireless edge access applications, such as cellular or WLAN, advanced protocols, modulation, encoding and spatial processing across multiple radio antennas have enabled increased data rates and ranges for numerous simultaneous users compared to analogous systems deployed 5 or 10 years ago for obstructed LOS propagation environments where multipath and co-channel interference were present. In such systems, "low gain" (usually <6 dBi) antennas are generally used at one or both ends of the radio link both to advantageously exploit multipath signals in the obstructed LOS environment and allow operation in different physical orientations as would be encountered with mobile devices. Although impressive performance results have been achieved for edge access, such results are generally inadequate for emerging backhaul requirements of data rates of 100 Mb/s or higher, ranges of 300 m or longer in obstructed LOS conditions, and latencies of 5 ms or less.

In particular, "street level" deployment of cellular base stations, WLAN access points or LAN gateways (e.g., deployment at street lamps, traffic lights, sides or rooftops of single or low-multiple story buildings) suffers from problems because there are significant obstructions for LOS in urban environments (e.g., tall buildings, or any environments where tall trees or uneven topography are present).

FIG. 1 illustrates edge access using conventional unobstructed LOS PTP microwave radios 132. The scenario depicted in FIG. 1 is common for many $2^{nd}$ Generation (2G) and $3^{rd}$ Generation (3G) cellular network deployments using "macrocells". In FIG. 1, a Cellular Base Transceiver Station (BTS) 104 is shown housed within a small building 108 adjacent to a large tower 112. The cellular antennas 116 that communicate with various cellular subscriber devices 120 are mounted on the towers 112. The PTP microwave radios 132 are mounted on the towers 112 and are connected to the BTSs 104 via an nT1 interface. As shown in FIG. 1 by line 136, the radios 132 require unobstructed LOS.

The BTS on the right 104a has either an nT1 copper interface or an optical fiber interface 124 to connect the BTS 104a to the Base Station Controller (BSC) 128. The BSC 128 either is part of or communicates with the core network of the cellular network operator. The BTS on the left 104b is identical to the BTS on the right 104a in FIG. 1 except that the BTS on the left 104b has no local wireline nT1 (or optical fiber equivalent) so the nT1 interface is instead connected to a conventional PTP microwave radio 132 with unobstructed LOS to the tower on the right 112a. The nT1 interfaces for both BTSs 104a, 104b can then be backhauled to the BSC 128 as shown in FIG. 1.

As described above, conventional microwave backhaul radios have used "high gain" (typically >30 dBi or even >40 dBi) to achieve desired combinations of high throughput, long range and low latency in bridging remote data networks to core networks for unobstructed line of sight (LOS) propagation conditions. Because of their very narrow antenna radiation patterns and manual alignment requirements, these conventional microwave backhaul radios are completely unsuitable for applications with remote data network backhaul in obstructed LOS conditions, such as deployment on street lamps, traffic lights, low building sides or rooftops, or any fixture where trees, buildings, hills, etc., which substantially impede radio propagation from one point to another.

Additionally, such conventional microwave backhaul radios typically have little or no mechanism for avoiding unwanted interference from other radio devices at the same channel frequency, other than the narrowness of their radiation patterns. Thus, users of such equipment are often skeptical of deployment of such conventional backhaul radios for critical applications in unlicensed spectrum bands. Even for common licensed band deployments, such as under the United States Federal Communications Commission (FCC) Part 101 rules, conventional backhaul radios are typically restricted to a particular channel frequency, channel bandwidth and location placement based on a manual registration process carried out for each installation. This is slow, inefficient, and error prone as well as wasteful of spectrum resources due to underutilization, even with the undesirable restriction of unobstructed LOS conditions.

Furthermore, once deployed in the field, conventional microwave backhaul radios are typically islands of connectivity with little or no capability to monitor the spectrum usage broadly at the deployment location or coordinate with other radios in the vicinity to optimally use spectrum resources.

FIG. 2 illustrates an exemplary deployment of multiple conventional backhaul radios (CBRs) 132 as discrete point to point (PTP) links 204 to bridge remote data access networks (ANs) 208 to a private core network (PCN) 212. Each link 204 requires unobstructed LOS propagation and is limited to a single PTP radio configuration. To the extent that multiple links originate from a common location, the CBRs 132 at such location require spatial and directional separation if co-channel operation is used.

Typically, the operator of the PCN 212 will use an element management system (EMS) 216 specific to particular CBRs 132 to monitor deployed and configured CBR links within the PCN 212. Often, an EMS 216 allows fault monitoring, configuration, accounting, performance monitoring and security key management (FCAPS) for the CBRs 132 within the PCN 212. However, such a conventional EMS 216 does not dynamically modify operational policies or configurations at each CBR 132 in response to mutual interactions, changing network loads, or changes in the radio spectrum environment in the vicinity of the deployed CBRs 132. Furthermore, such an EMS 216 is typically isolated from communications with or coordination amongst other EMSs at other PCNs (not shown) that may be overlapping geographically from a radio spectrum perspective.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

In copending U.S. patent application Ser. No. 13/212,036, entitled Intelligent Backhaul Radio, filed Aug. 17, 2011, the entirety of which is hereby incorporated by reference, the present inventor disclosed backhaul radios that are compact, light and low power for street level mounting, operate at 100 Mb/s or higher at ranges of 300 m or longer in obstructed LOS conditions with low latencies of 5 ms or less, can support PTP and PMP topologies, use radio spectrum resources efficiently and do not require precise physical antenna alignment. Radios with such exemplary capabilities are referred to as Intelligent Backhaul Radios (IBRs).

These IBRs overcome the limitation of obstructed LOS operation and enable many desirable capabilities such as, for example only, monitoring of spectrum activity in the vicinity of the deployment and actively avoiding or mitigating co-channel interference. To fully utilize these and other capabilities of the IBRs, it is advantageous to manage and control multiple IBRs within a geographic zone collectively as an "Intelligent Backhaul System" (or IBS).

According to an aspect of the invention, an intelligent backhaul system is disclosed that includes a plurality of intelligent backhaul radios, each of the plurality of intelligent backhaul radios including a plurality of receive RF chains; one or more transmit RF chains; an antenna array including a plurality of directive gain antenna elements, wherein each directive gain antenna element is couplable to at least one receive RF or transmit RF chain; a radio resource controller, wherein the radio resource controller sets or causes to be set a certain RF carrier frequency or channel bandwidth for at least one of the receive or transmit RF chains; an interface bridge configured to couple the intelligent backhaul radio to a data network, the interface bridge including one or more Ethernet interfaces to couple the interface bridge to the data network, the interface bridge multiplexing and buffering the one or more Ethernet interfaces; and a media access controller to exchange data to and from the data network via coupling to at least the interface bridge and to and from at least one other intelligent backhaul radio, wherein one or more of the plurality of intelligent backhaul radios includes an intelligent backhaul management system agent coupled to the radio resource controller, and wherein said intelligent backhaul management system agent sets or causes to be set certain policies related to the RF carrier frequency or channel bandwidth for at least one of the receive or transmit RF chains; and a server in communication with the intelligent backhaul management system agent within at least one of the plurality of intelligent backhaul radios, wherein the server is configured to manage or control at least one of the plurality of intelligent backhaul radios.

The server may be configured to be a topology coordinator.

The server may be configured to store, archive and index data received from the plurality of intelligent backhaul radios.

The server may generate polices used to configure, manage and control the plurality of intelligent backhaul radios.

The server may modify polices used to configure, manage and control the plurality of intelligent backhaul radios.

The server may be configured to generate a configuration file for at least one of the plurality of intelligent backhaul radios.

The server may be configured to generate configuration settings for at least one of the plurality of intelligent backhaul radios.

The server may be configured to determine network traffic shaping and classifying policies for at least one of the plurality of intelligent backhaul radios.

The server may be configured to enforce provisions of service level agreements.

The intelligent backhaul system may further include one or more intelligent backhaul controllers.

The intelligent backhaul controller may provide a synchronization reference to at least one of the plurality of intelligent backhaul radios.

At least one of the plurality of intelligent backhaul radios may include an intelligent backhaul controller.

The intelligent backhaul management system agent in at least one of the plurality of intelligent backhaul radios exchanges information with other intelligent backhaul management system agents within other radios of the plurality of intelligent backhaul radios or with the server. The intelligent backhaul management system agent may report operational parameters to the server.

At least one of the plurality of intelligent backhaul controllers may include an intelligent backhaul management system agent that sets or causes to be set certain policies, wherein the intelligent backhaul management system agent exchanges information with other intelligent backhaul management system agents within intelligent backhaul radios, intelligent backhaul management system agents within other intelligent backhaul controllers or with the server. The intelligent backhaul management system agent may report operational parameters to the server.

The server may include at least one of a private server and a global server.

The intelligent backhaul controller may include a wireless adapter.

The intelligent backhaul controller may include a plurality of network interfaces; a host controller; an intelligent backhaul management system agent; a wireless adapter; a managed switch coupled to the plurality of network interfaces, the host controller, the intelligent backhaul management system agent and the wireless adapter; a power supply configured to receive a power input; and a remote power switch coupled to the power supply and the plurality of network interfaces.

The intelligent backhaul controller may further include a battery backup coupled to the power supply.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
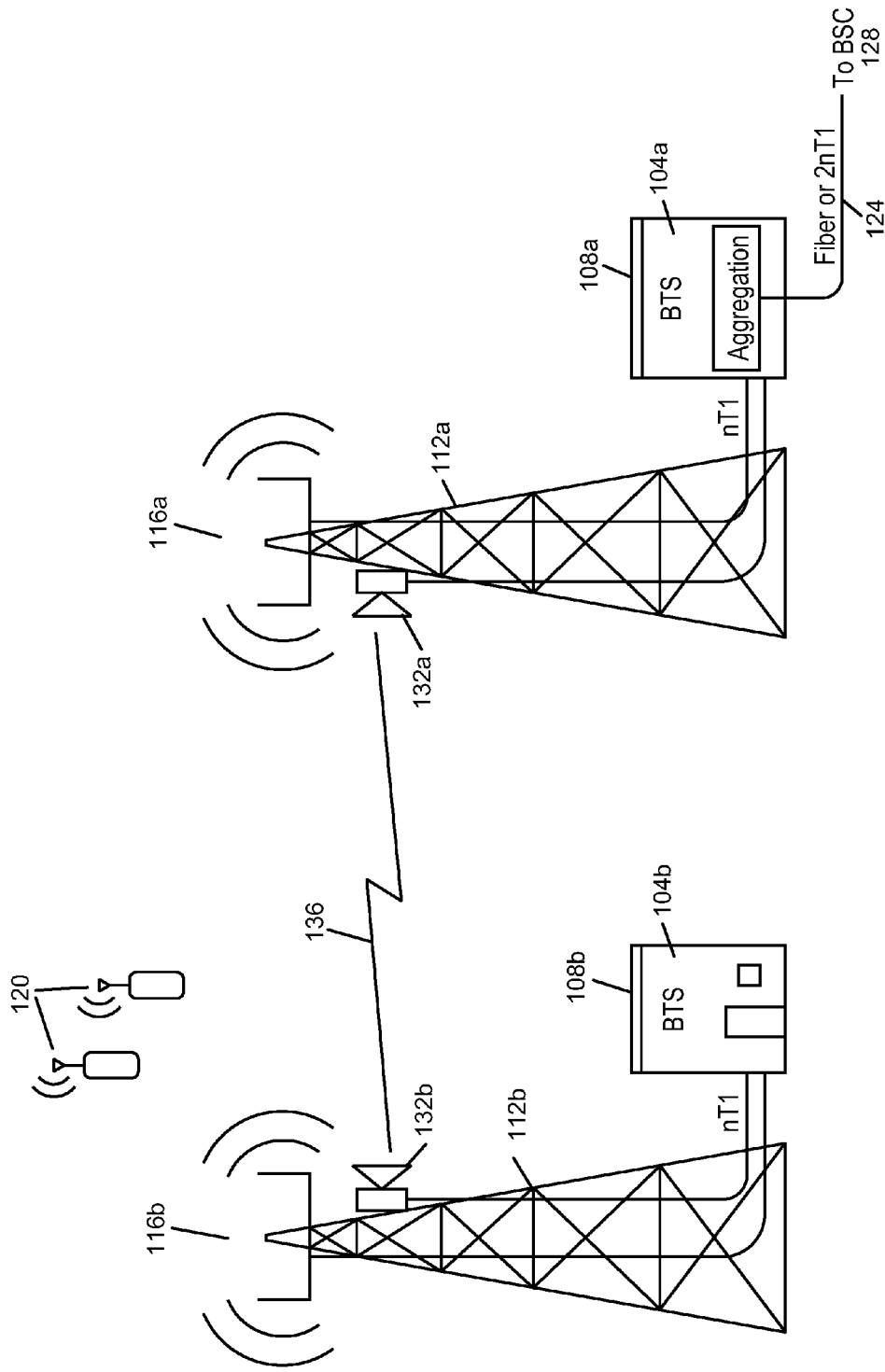
FIG. 1 is an illustration of conventional point to point (PTP) radios deployed for cellular base station backhaul with unobstructed line of sight (LOS).
Figure 2:
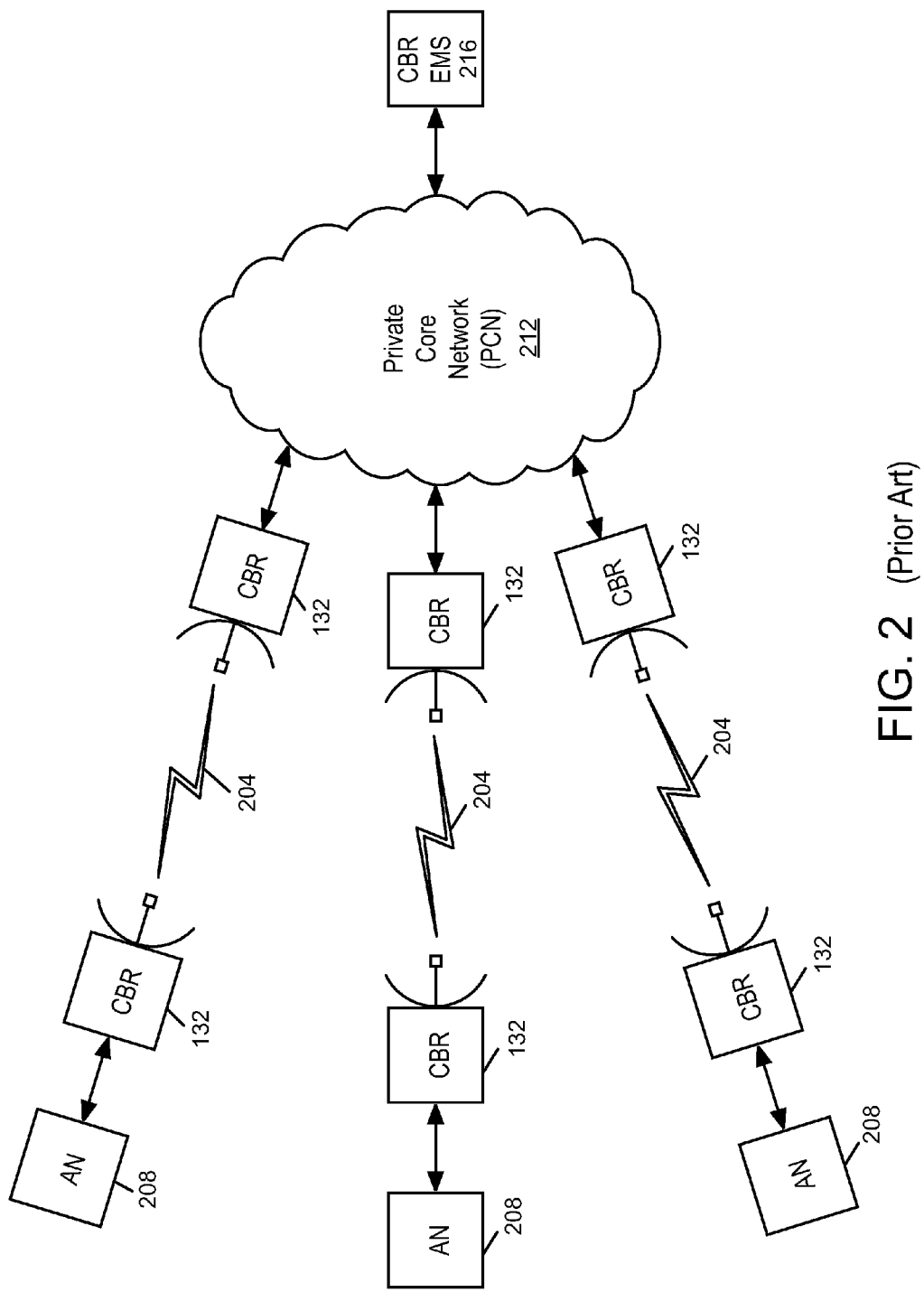
FIG. 2 is an illustration of an exemplary deployment of conventional backhaul radios.
Figure 3:
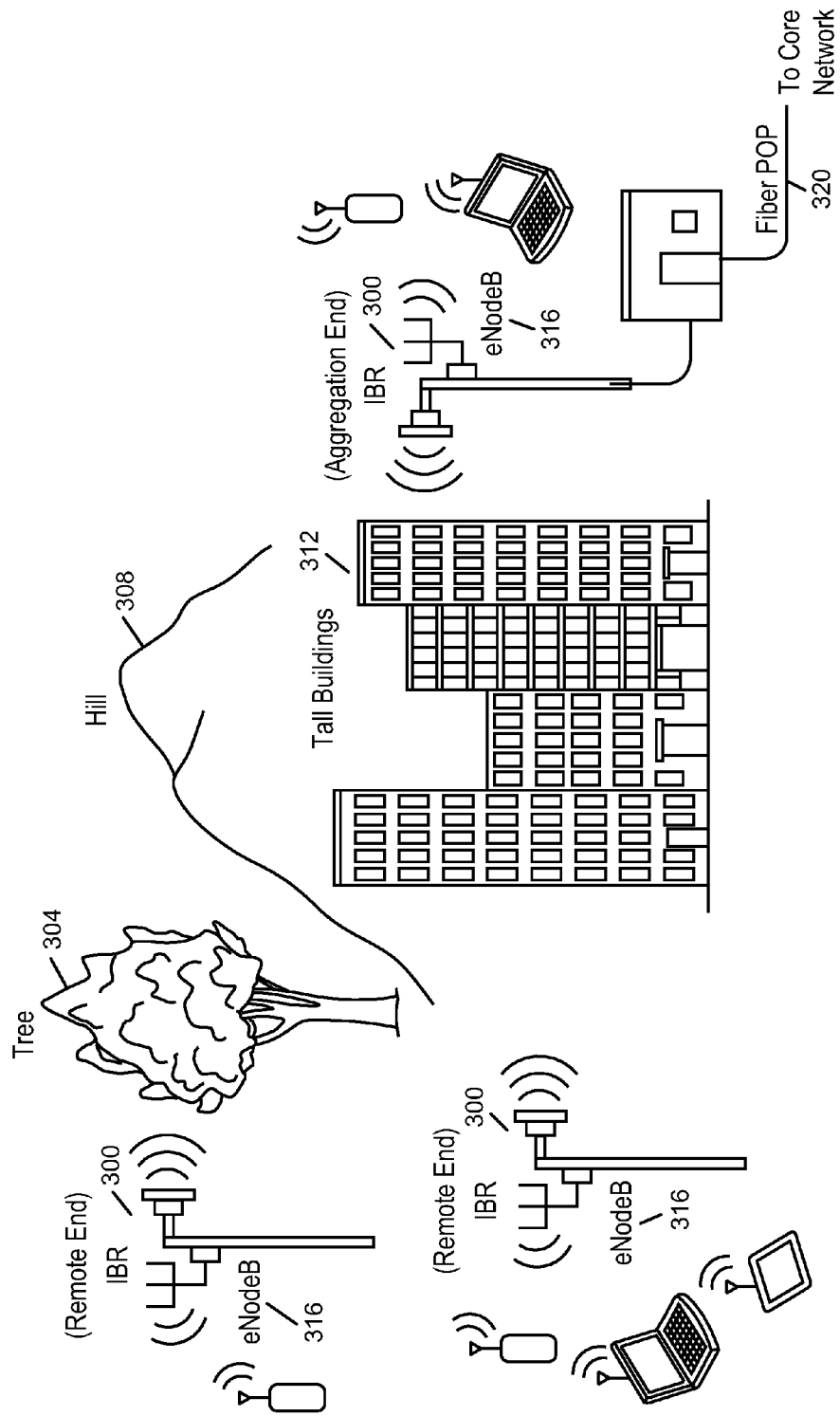
FIG. 3 is an illustration of intelligent backhaul radios (IBRs) deployed for cellular base station backhaul with obstructed LOS according to one embodiment of the invention.

FIG. 3 illustrates deployment of intelligent backhaul radios (IBRs) in accordance with an embodiment of the invention. As shown in FIG. 3, the IBRs 300 are deployable at street level with obstructions such as trees 304, hills 308, buildings 312, etc. between them. The IBRs 300 are also deployable in configurations that include point to multipoint (PMP), as shown in FIG. 3, as well as point to point (PTP). In other words, each IBR 300 may communicate with one or more than one other IBR 300.

For 3G and especially for $4^{th}$ Generation (4G), cellular network infrastructure is more commonly deployed using "microcells" or "picocells." In this cellular network infrastructure, compact base stations (eNodeBs) 316 are situated outdoors at street level. When such eNodeBs 316 are unable to connect locally to optical fiber or a copper wireline of sufficient data bandwidth, then a wireless connection to a fiber "point of presence" (POP) requires obstructed LOS capabilities, as described herein.

For example, as shown in FIG. 3, the IBRs 300 include an Aggregation End IBR (AE-IBR) and Remote End IBRs (RE-IBRs). The eNodeB 316 of the AE-IBR is typically connected locally to the core network via a fiber POP 320. The RE-IBRs and their associated eNodeBs 316 are typically not connected to the core network via a wireline connection; instead, the RE-IBRs are wirelessly connected to the core network via the AE-IBR. As shown in FIG. 3, the wireless connection between the IBRs include obstructions (i.e., there may be an obstructed LOS connection between the RE-IBRs and the AE-IBR).

Figure 4:
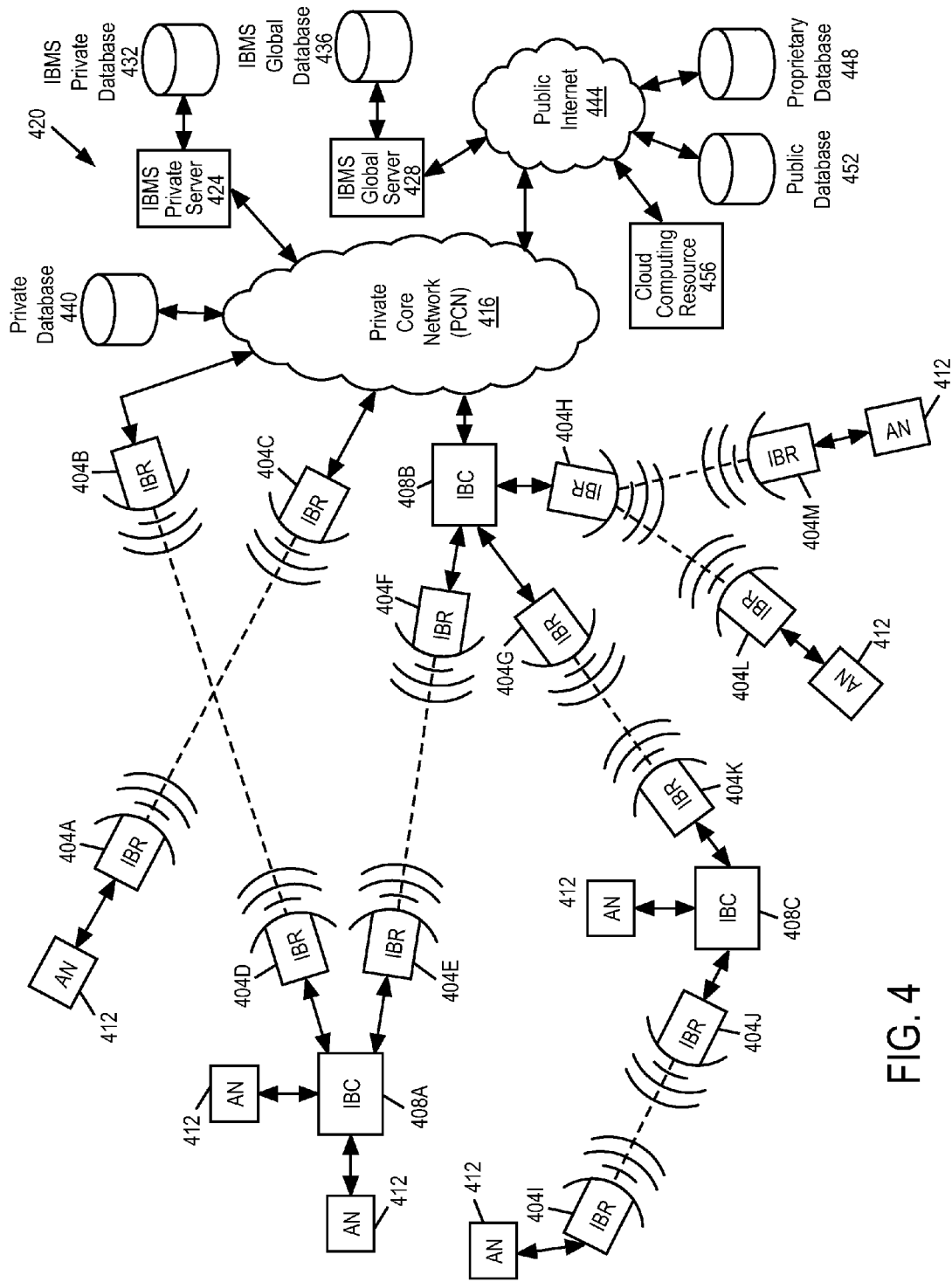
FIG. 4 is an exemplary deployment of an intelligent backhaul system (IBS) according to one embodiment of the invention.

FIG. 4 illustrates an exemplary deployment of an intelligent backhaul system (IBS) 400. The IBS 400 includes multiple IBRs 404 that can operate in both obstructed and unobstructed LOS propagation conditions. The IBS 400 has several features that are not typical for conventional line of sight microwave backhaul systems.

First, the IBS 400 includes multiple IBRs 404. Exemplary IBRs are shown and described below with reference to, for example, FIG. 5 of the present application, and are disclosed in detail in copending U.S. patent application Ser. No. 13/212,036, entitled Intelligent Backhaul Radio, filed Aug. 17, 2011, the entirety of which is hereby incorporated by reference. It will be appreciated that there are many possible embodiments for the IBRs as described herein and in copending U.S. patent application Ser. No. 13/212,036. The IBRs 404 are able to function in both obstructed and unobstructed LOS propagation conditions.

Second, the IBS 400, optionally, includes one or more "Intelligent Backhaul Controllers" (IBCs) 408. As shown in FIG. 4, for example, the IBCs 408 are deployed between the IBRs 404 and other network elements, such as remote data access networks (ANs) 412 and a private core network (PCN) 416.

Third, the IBS 400 includes an "Intelligent Backhaul Management System" (IBMS) 420. As shown in FIG. 4, the IBMS 420 includes a private server 424 and/or a public server 428. The IBMS 420 may also include an IBMS agent in one or more of the IBRs 404. The IBMS agent is described in detail with reference to FIG. 5 of the present application and FIG. 7 of copending U.S. application Ser. No. 13/212,036. An IBMS agent may, optionally, be included within one or more of the IBCs 408.

Figure 5:
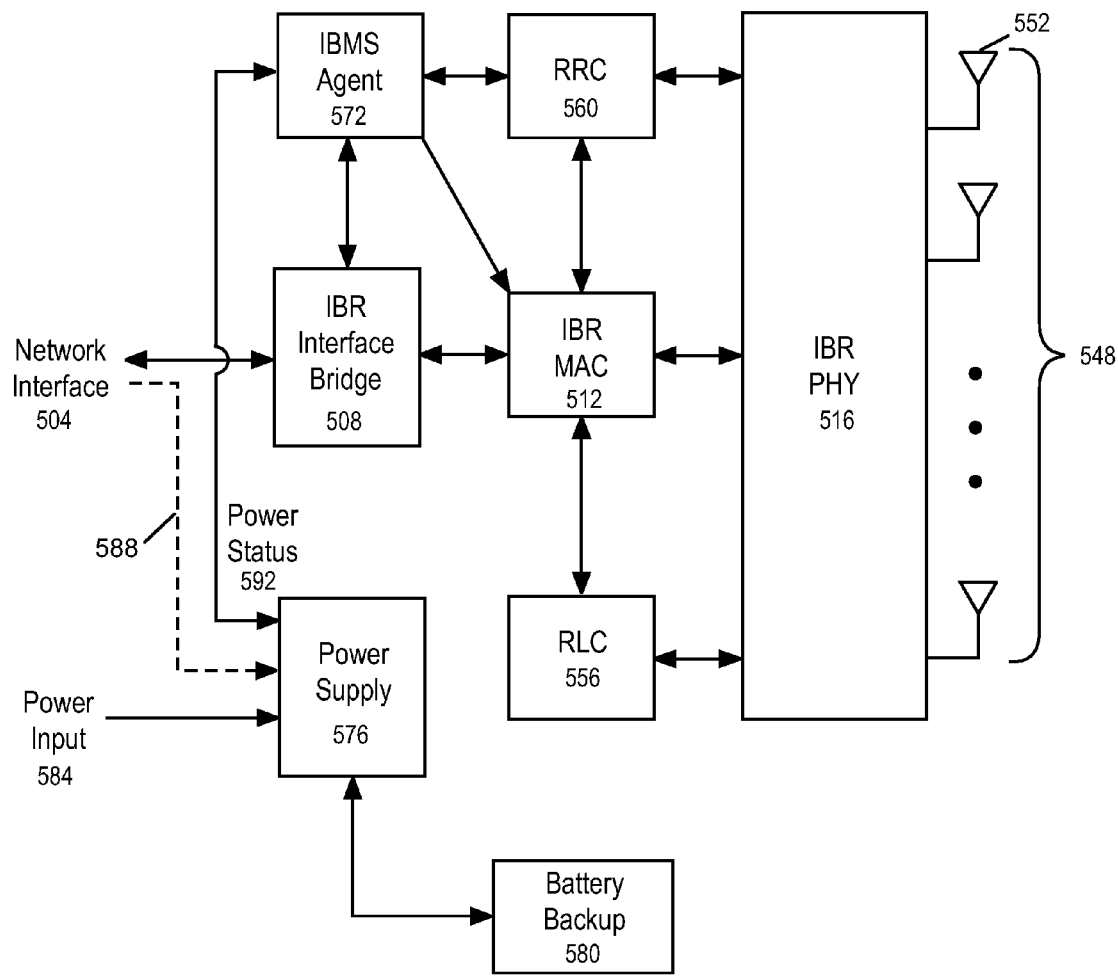
FIG. 5 is a block diagram of an IBR according to one embodiment of the invention.

FIG. 5 is a simplified block diagram of the IBRs 404 shown in FIG. 4. In FIG. 5, the IBRs 404 include interfaces 504, interface bridge 508, MAC 512, a physical layer 516, antenna array 548 (includes multiple antennas 552), a Radio Link Controller (RLC) 556 and a Radio Resource Controller (RRC) 560. The IBR may optionally include an IBMS agent 572. FIG. 5 illustrates, in particular, an exemplary embodiment for powering the IBR 404. In FIG. 5, the IBR 404 also includes a Power Supply 576 and an optional Battery Backup 580. The Power Supply 576 may receive a Power Input 584 or an alternative power input derived from a network interface 504. It will be appreciated that the components and elements of the IBRs may vary from that illustrated in FIG. 5.

In some embodiments, the IBR Interface Bridge 508 physically interfaces to standards-based wired data networking interfaces 504 as Ethernet 1 through Ethernet P. "P" represents a number of separate Ethernet interfaces over twisted-pair, coax or optical fiber. The IBR Interface Bridge 508 can multiplex and buffer the P Ethernet interfaces 504 with the IBR MAC 512. The IBR Interface Bridge 508 may also include an optional IEEE 802.11 (or WiFi) adapter. IBR Interface Bridge 508 also preserves "Quality of Service" (QoS) or "Class of Service" (CoS) prioritization as indicated, for example, in IEEE 802.1q 3-bit Priority Code Point (PCP) fields within the Ethernet frame headers, such that either the IBR MAC 512 schedules such frames for transmission according to policies configured within the IBR of FIG. 5 or communicated via the IBMS Agent 572, or the IBR interface bridge 508 schedules the transfer of such frames to the IBR MAC 512 such that the same net effect occurs. In other embodiments, the IBR interface bridge 508 also forwards and prioritizes the delivery of frames to or from another IBR over an instant radio link based on Multiprotocol Label Switching (MPLS) or Multiprotocol Label Switching Transport Profile (MPLS-TP).

In general, the IBR utilizes multiple antennas and transmit and/or receive chains which can be utilized advantageously by several well-known baseband signal processing techniques that exploit multipath broadband channel propagation. Such techniques include Multiple-Input, Multiple-Output (MIMO), MIMO Spatial Multiplexing (MIMO-SM), beamforming (BF), maximal ratio combining (MRC), and Space Division Multiple Access (SDMA).

The Intelligent Backhaul Management System (IBMS) Agent 572 is an optional element of the IBR that optimizes performance of the instant links at the IBR as well as potentially other IBR links in the nearby geographic proximity including potential future links for IBRs yet to be deployed.

Figure 6:
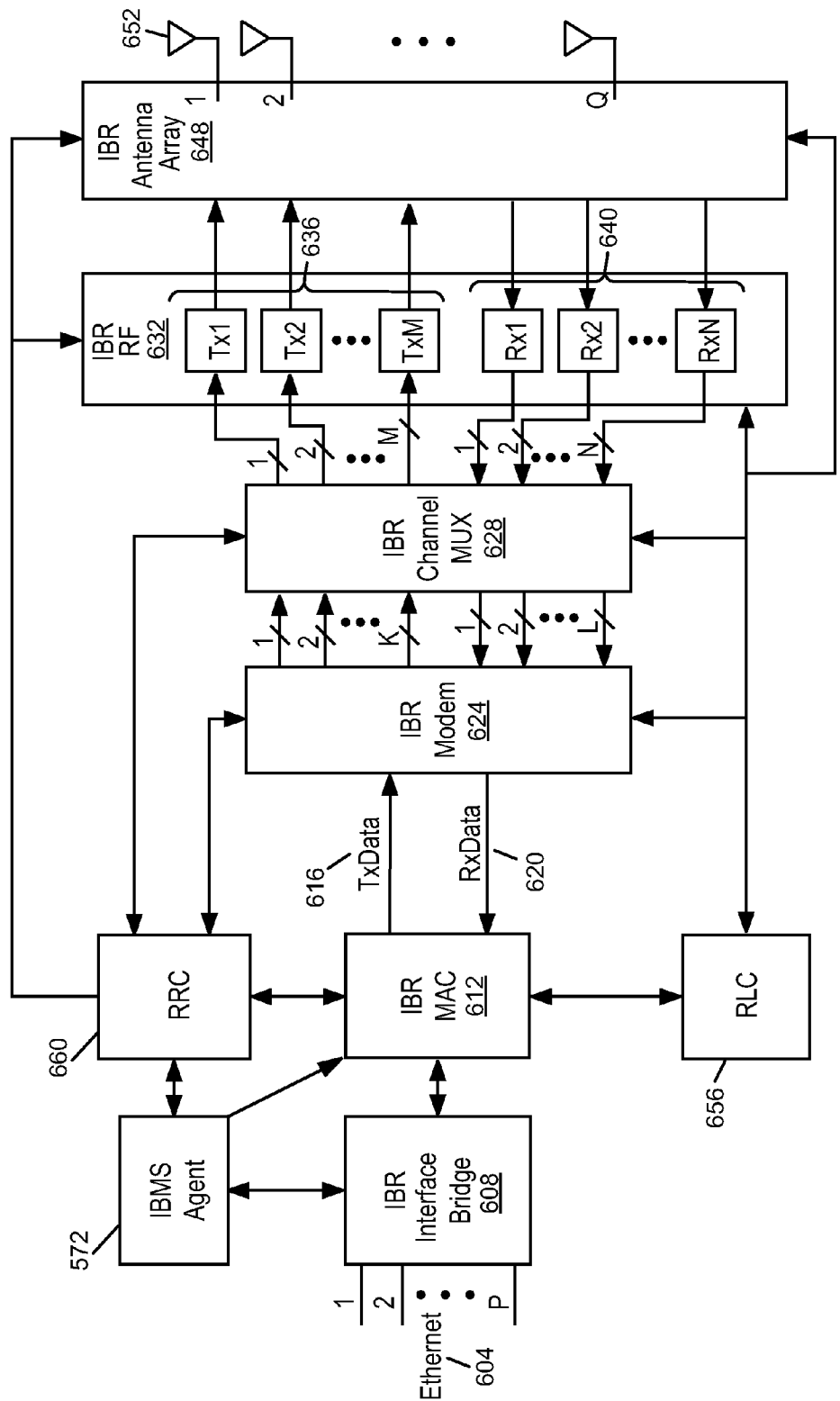
FIG. 6 is a block diagram of an IBR according to one embodiment of the invention.

FIG. 6 illustrates an exemplary detailed embodiment of the IBR 400 illustrating some additional details. FIG. 6 corresponds to FIG. 7 of copending U.S. application Ser. No. 13/212,036. As shown in FIG. 6, the IBR 400 includes interfaces 604, interface bridge 608, media access controller (MAC) 612, modem 624, which includes one or more demodulator cores and modulator cores, channel multiplexer (MUX) 628, RF 632, which includes transmit chains (Tx1 . . . TxM) 636 and receive chains (Rx1 . . . RxN) 640, antenna array 648 (includes multiple directive gain antennas/antenna elements 652), a Radio Link Controller (RLC) 656, a Radio Resource Controller (RRC) 660 and the IBMS agent 572. It will be appreciated that the components and elements of the IBRs may vary from that illustrated in FIG. 6.

The primary responsibility of the RRC 660 is to set or cause to be set at least the one or more active RF carrier frequencies, the one or more active channel bandwidths, the choice of transmit and receive channel equalization and multiplexing strategies, the configuration and assignment of one or more modulated streams amongst the one or more modulator cores, the number of active transmit and receive RF chains, and the selection of certain antenna elements and their mappings to the various RF chains. Optionally, the RRC 660 may also set or cause to be set the superframe timing, the cyclic prefix length, and/or the criteria by which blocks of Training Pilots are inserted. The RRC 660 allocates portions of the IBR operational resources, including time multiplexing of currently selected resources, to the task of testing certain links between an AE-IBR and one or more RE-IBRs. The MAC 612 exchanges data to and from a remote access data network via coupling to at least the interface bridge 608 and to and from at least one other intelligent backhaul radio. The MAC 612 inputs receive data from a receive path and outputs transmit data to the transmit path.

Additional details regarding the features and operation of the IBR 400 are disclosed in copending U.S. application Ser. No. 13/212,036, the entirety of which is hereby incorporated by reference. For example, the various policies and configuration parameters used by the RRC 660 to allocate resources within and amongst IBRs with active links to each other are sent from the IBMS Agent 572 to the RRC 660. In the return direction, the RRC 660 reports operational statistics and parameters back to the IBMS Agent 572 both from normal operation modes and from "probe in space" modes as directed by the IBMS Agent 572.

With reference back to FIG. 5, the IBR 400 also includes a power supply 576. In some embodiments, a Power Input 584 to the Power Supply 576 is an alternating current (AC) supply of, for example, 120V, 60 Hz or 240V, 50 Hz or 480V, 60 Hz, 3-phase. Alternatively, the Power Input 584 may be a direct current (DC) supply of, for example, +24V, −48V, or −54V.

The Power Supply 576 outputs voltage to other elements of the IBR 404. In some embodiments, typical Power Supply 576 output voltages are DC voltages such as +12V, +5V, +3.3V, +1.8V, +1.2V, +1.0V or −1.5V.

In the event that the Power Supply 576 loses its Power Input 584 for any reason, the Battery Backup 580 may provide an alternative power input to the Power Supply 576 so that IBR operation may continue for some period of time. This is particularly advantageous for ANs at remote locations wherein critical communications services may be needed during temporary main power supply outages. The Battery Backup 580 is typically charged by a DC input such as +18V or +12V from the Power Supply 576.

As shown in FIG. 5, the Power Supply 576 may optionally receive a power input derived from a network interface 504. For IBRs that require approximately 15 W of power or less, an exemplary power input from a network interface 504 is "Power over Ethernet" (or PoE) as defined by IEEE 802.af. For other IBRs that require approximately 25 W of power or less, an exemplary power input from a network interface 504 is "Power over Ethernet Plus" (or PoE+) as defined by IEEE 802.at. Typical DC voltages associated with POE are +48V or −48V, and typical DC voltages associated with PoE+ are +54V or −54V.

In some embodiments, it may be desirable for the Power Supply 576 to operate from AC main supplies, such as 120V, 240V or 480V, in two separate structures. First, an AC to DC converter creates a DC power input such as +24V, +12V, +18V, −48V, −54V, etc; and, second, a DC to DC converter creates the DC voltages required internal to the IBR such as +12V, +5V, +3.3V, +1.8V, +1.2V, +1.0V, −1.5V, etc.

In embodiments in which the Power Supply 576 includes these two separate structures, the AC to DC converter portion of the Power Supply 576 may be physically external to the main enclosure of the IBR while the DC to DC converter portion of the Power Supply 576 is internal to the main enclosure of the IBR. Similarly, in some embodiments, the Battery Backup 580 may be external to the main enclosure of the IBR. Similarly, for IBRs with a WiFi Adapter capability as described in copending U.S. application Ser. No. 13/212,036, the WiFi Adapter may be positioned internal to or external of the enclosure of the IBR.

The IBMS Agent shown in FIG. 5 can function as described in copending U.S. application Ser. No. 13/212,036 and/or as described in more detail below. As shown in FIG. 5, in some embodiments, the Power Supply 576 may provide a control signal (Power Status) 592 to the IBMS Agent 572 that communicates, for example, if the Power Supply 576 is operating from a Power Input 584, a derived power input from a network interface 588, or from an optional Battery Backup 580 and possibly an estimated current reserve level for such Battery Backup. In such embodiments, the IBMS Agent 572 may relay this status 592 to other elements of the IBS 400.

Figure 7:
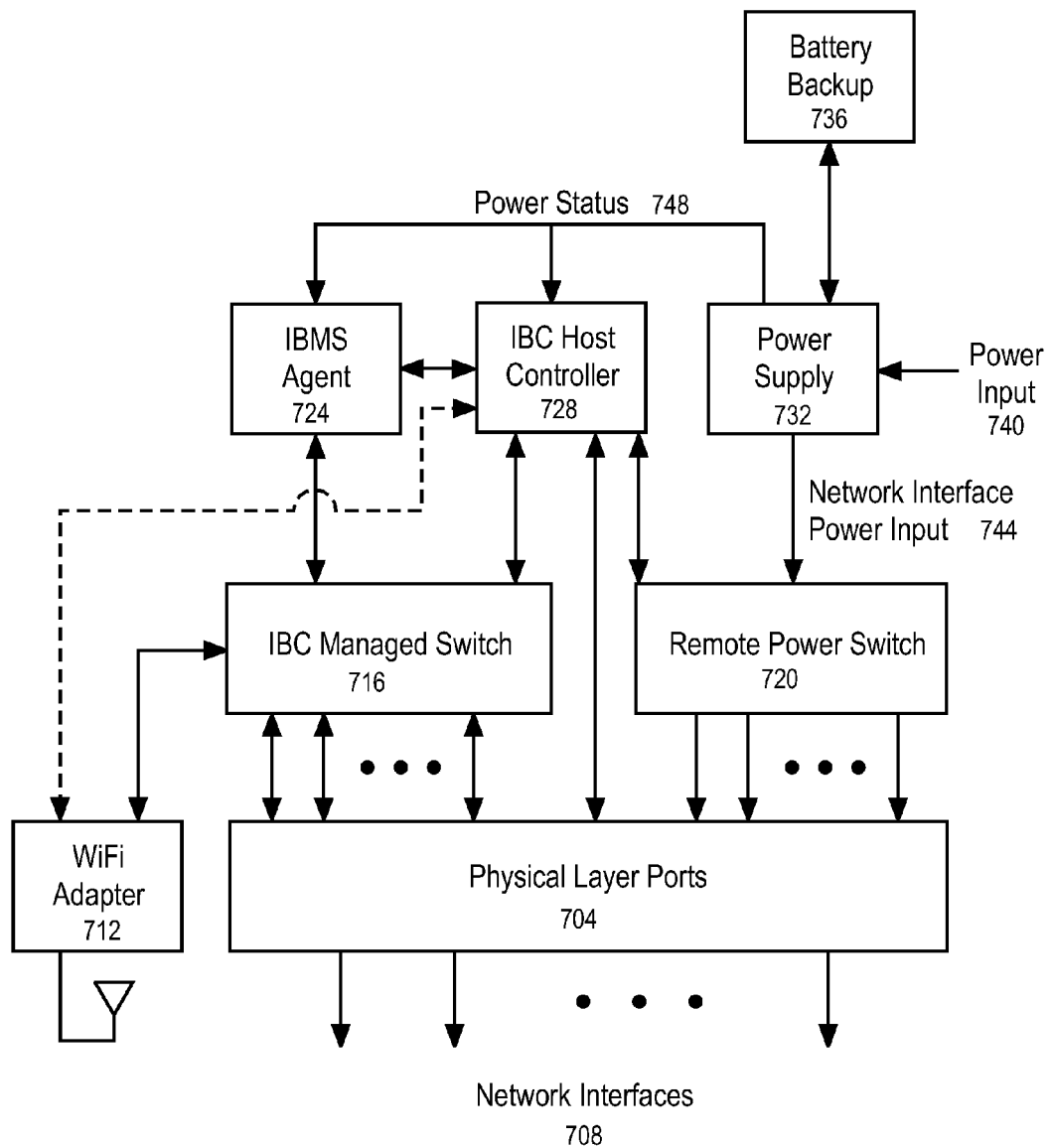
FIG. 7 is a block diagram of an intelligent backhaul controller (IBC) according to one embodiment of the invention.

FIG. 7 illustrates a simplified block diagram of IBCs 408A-C of FIG. 4. As shown in FIG. 7, the IBC 408 includes a plurality of physical layer ports 704 that include a plurality of network interfaces 708. The IBC 408 also includes a wireless adapter 712, an IBC managed switch 716, a remote power switch 720, an IBMS agent 724, and an IBC host controller 728. The IBC 408 may also include a power supply 732 and an optional battery backup 736.

In some embodiments, the plurality of Network Interfaces 708 are typically an Ethernet or IEEE 802.3 interfaces based on copper wires or fiber optics. Typically, such Ethernet interfaces support data rates of 1 Gb/s, 10 Gb/s or higher. Each Network Interface 708 is typically coupled to a respective Physical Layer Port 704 and in turn typically coupled to a respective Layer 2 port within the IBC Managed Switch 716.

In some embodiments, the IBC Managed Switch 716 is a substantially conventional Layer 2 switch in accordance with standard features defined by various IEEE 802.1 and 802.2 specifications. For example, the IBC Managed Switch 716 may be compliant with IEEE 802.1D for MAC-layer bridging across various ports and IEEE 802.1Q for adding Virtual Local Area Networking (VLAN) tags and the 3-bit 802.1p Priority Code Point (PCP) field. VLAN capability enables the IBC Managed Switch 716 to be segmented amongst certain subsets of the available switch ports and the PCP fields enable certain frames to have higher delivery priority than other frames. Other exemplary IBC Managed Switch 716 capabilities include compliance with IEEE 802.1x for access control, IEEE 802.1AB for link layer discovery, IEEE 802.1AE for MAC layer security, and IEEE 802.1AX for link aggregation and resiliency as well as numerous derivative standards specifications based on the above list (and IEEE 802.1D and 802.1Q).

In some embodiments, the IBC Managed Switch 716 may also have certain routing or packet-forwarding capabilities, such as routing by Internet Protocol (IP) address or packet-forwarding by Multiprotocol Label Switching (MPLS) in a substantially conventional fashion. In particular, some IBC Managed Switches 716 may operate as an MPLS Label Switch Router (LSR) while other MPLS-compatible devices within certain ANs operate as Label Edge Routers (LERs that represent ingress and egress points for packets within an MPLS network). In other embodiments, the IBC Managed Switch 716 may alternatively or additionally operate as an LER that affixes or removes MPLS labels having at least a label value or identifier, a 3-bit traffic class field (analogous to the PCP filed in IEEE 802.1 or the precedence bits in the Type of Service field in IP headers), and a time-to live field. Based on MPLS labels, such IBC Managed Switches 716 forward packets to particular ports (or possibly sets of ports in a VLAN segment) corresponding to certain ANs or IBRs as associated with particular "tunnels" to other MPLS LERs or LSRs, or based on MPLS ingress or egress ports from the IBC Managed Switch 716 when operating as an MPLS LER.

In some embodiments, the IBC Managed Switch 716 may alternatively or additionally operate as an MPLS Transport Profile (MPLS-TP) switch to provide connection-oriented, packet-switching on specific paths between such an IBC and typically another such IBC or peer MPLS-TP device at the edge of the PCN 416.

In some embodiments, the IBC Managed Switch 716 may alternatively or additionally operate as a Carrier Ethernet switch that provides one or more Ethernet Virtual Connections (EVCs) according to standards promulgated by the Metro Ethernet Forum (MEF). For example, in such embodiments, certain IBC Network Interface 708 ports may be configured within the IBC Managed Switch 716 as an MEF User Network Interface (UNI) port. Typically, such an IBC UNI port, if associated with an AN 412 at an IBC 408 on a remote location, can then be paired to another UNI (possibly at another IBC) at the edge of the PCN (at an aggregation point) via an EVC. Depending on the configuration of the IBC Managed Switch 716 and other network elements, the EVC could be an E-Line such as an Ethernet Private Line, an E-LAN such as an Ethernet Private LAN, or an E-Tree. For deployments such as shown in FIG. 4, an exemplary IBC 408 with MEF capability can also interact with one or more IBR-based links to provide Committed Information Rate (CIR) and Excess Information Rate (EIR). These interactions may be direct via one or more Network Interfaces 708 or optionally indirect via the IBMS 420.

As shown in FIG. 7, the IBC 408 may also include an IBC Host Controller 728. The IBC host controller 728 may be implemented as software on one or more microprocessors. In some embodiments, the IBC Host Controller 728 directs the operation of the IBC Managed Switch 716 according to policies provided to the IBC 408. The scope of policies applicable to a given IBC 408 depends on the particular set of IBC Managed Switch capabilities, as described above. Typical policies relate to the mapping between Network Interface 708 ports assigned to ANs 412 and those assigned to IBRs 404 as realized within the IBC Managed Switch 716. In many cases, the policies may be derived from Service Level Agreements (SLAs) that govern the desired and/or required performance attributes of backhaul connections between particular ANs 412 or users of ANs 412 and the PCN 416.

In some embodiments, the policies administered by the IBC Host Controller 728 in directing the behavior of the IBC Managed Switch 716 are supplied by the IBMS Agent 724. In some embodiments, such policies are alternatively or additionally supplied by a console interface to the IBC 408 at the time of initial deployment or later.

As shown in FIG. 7, the IBC 408 may also include an IEEE 802.11 Wireless LAN interface (i.e. a "WiFi Adapter") 712. In some embodiments, the WiFi Adapter 712 may be configured as a public or private IEEE 802.11 access point based on one or more standard specifications such as IEEE802.11g, IEEE802.11n or subsequent IEEE 802.11 variants. In this situation, the IBC effectively integrates a WiFi-based AN within the IBC that is attached to an internal port of the IBC Managed Switch 716 such that traffic to or from the WiFi AN can be bridged to one or more IBRs 404, or passed to an IBMS Agent 724, 576 (at either the IBC 408 or within the one or more attached IBRs 404) or the IBC Host Controller 728 over standard network protocols, such as TCP or UDP on IP. This permits terminal devices such as smartphones, tablets or laptop computers to act as a console input to easily access, monitor or configure policies and performance data associated with the IBC 408, or via the IBC Managed Switch 716, also access, monitor or configure policies and performance data at one or more IBRs 404 attached to the IBC 408. This is particularly advantageous for IBCs 408 and/or IBRs 404 that are mounted in locations without easy physical accessibility, such as those mounted on street lamps, utility poles, and building sides or masts that are insufficient to support humans at the IBC or IBR mounting height. Similarly, such access to the IBC 408 and attached IBRs 404 can be realized via a WiFi Adapter within one of the attached IBRs 404 by bridging across an exemplary IBC 408.

Alternatively, in some embodiments, the WiFi Adapter 712 may be optionally connected to the IBC Host Controller 728 (instead of the IBC Managed Switch 716) over a serial bus or other internal bus suitable for peripheral I/O devices. In this embodiment, the WiFi Adapter 712 would not be suitable for public or private WiFi access point usage at commercially-desirable throughputs, but may still be suitable for console mode operation to access, monitor or configure policies and performance data at the IBC 408 and possibly at attached IBRs 404 to the extent permitted by the software executing on the IBC Host Controller 728.

In some embodiments, the optional WiFi Adapter 712 may be physically contained within the enclosure of the IBC 408, subject to consideration of antenna location for effective propagation especially for elevated mounting and ground level access. In other embodiments, the optional WiFi Adapter 712 may be external to the IBC physical enclosure and either connected via an external Network Interface 708 or via an external mounting interface to the IBC Managed Switch 716 optimized specifically for an attached external WiFi Adapter.

For embodiments of the IBC 408 or IBR 404 that include a WiFi Adapter, it is possible to access such devices with the WiFi Adapter configured as an access point, as a peer to peer station device, as a station device wherein the portable terminal (smartphone, tablet, laptop computer, etc.) is configured as an access point, or via WiFi direct.

In FIG. 7, the IBC 408 also includes a Power Supply 732 and an optional Battery Backup 736. The Power Input 740 to the Power Supply 732 may be an alternating current (AC) supply of, for example, 120V, 60 Hz or 240V, 50 Hz or 480V, 60 Hz, 3-phase. Alternatively, the Power Input 740 may be a direct current (DC) supply of for example, +24V, −48V, or −54V. Typical Power Supply 732 output voltages to the various elements of the IBC are DC voltages such as +12V, +5V, +3.3V, +1.8V, +1.2V, +1.0V or −1.5V.

The optional Battery Backup 736 may be charged by a DC input, such as +18V or +12V, from the Power Supply 732. In the event that the Power Supply 732 loses its Power Input 740 for any reason, the Battery Backup 736 may provide an alternative power input to the Power Supply 732 so that IBC operation may continue for some period of time. This is particularly advantageous for ANs at remote locations wherein critical communications services may be needed during temporary main power supply outages.

In some embodiments, a Power Supply 732 that operates from AC main supplies, such as 120V, 240V or 480V, includes two separate structures. First, the Power Supply 732 includes an AC to DC converter that creates a DC power input such as +24V, +12V, +18V, −48V, −54V, etc.; and, second, the Power Supply 732 includes a DC to DC converter that creates the DC voltages required internal to the IBC such as +12V, +5V, +3.3V, +1.8V, +1.2V, +1.0V, −1.5V, etc.

In these embodiments where the Power Supply 732 includes two separate structures, the AC to DC converter portion of the Power Supply 732 may be physically external to the main enclosure of the IBC 408 while the DC to DC converter portion of the Power Supply 732 remains internal to the main enclosure of the IBC 408. Similarly, for certain IBC embodiments, the Battery Backup 736 may be external to the main enclosure of the IBC 408.

Note that unlike the IBR 404, the IBCs 408 typically are not configured to use standards-based PoE or PoE+ as an alternate power input for powering the IBC 408. Instead, the IBCs 408 combine a PoE or PoE+ power injection capability that can be switched to some or all of the Network Interfaces 708 from a Remote Power Switch 720 via the Physical Layer Ports 704. Typically the Network Interface Power Input 744, such as +48V or −48V for PoE or +54V or −54V for PoE+, is provided by the Power Supply 732 and then switched under the direction of the IBC Host Controller 728 at the Remote Power Switch 720. The specific Network Interface 408 ports receiving PoE or PoE+ power from the Remote Power Switch 720 are determined based on configuration parameters set at time of deployment by, for example, console mode input or the IBMS Agent 724 or updated from time to time via the IBMS Agent 724.

Note also that as for the IBR 404, exemplary IBCs 408 may also have the Power Supply 732 provide a control signal (Power Status) 748 to at least the IBMS Agent 724 or the IBC Host Controller 728 that communicates, for example, if the Power Supply 732 is operating from a Power Input 740 or from an optional Battery Backup 736 and possibly an estimate current reserve level for such Battery Backup 736. As with the IBR 404, such Power Status 748 may be relayed by the IBMS Agent 724 to other IBMS elements. Alternatively or additionally, the IBMS Agent 724 and/or IBC Host Controller 728 may choose to restrict or terminate PoE or PoE+ power to certain Network Interfaces 708, whether AN 412 or IBR 404, based on policies as may currently be set at the IBC 408. Such restrictions or terminations may also consider the actual power consumption of particular Network Interfaces 708 as may be determined by the Remote Power Switch 720 and reported to the IBC Host Controller 728. One example of when it is advantageous to terminate PoE or PoE+ power under backup conditions is when the device, powered by the IBC 408, such as an AN 412 or IBR 404, are known to the IBC 408 (possibly via the IBMS) to have their own back-up power sources.

In some embodiments, the IBCs 408 may also provide synchronization capabilities to ANs 412, IBRs 404 or other network devices attached to the Network Interfaces 708. One methodology for providing synchronization at remote locations such as IBCs 408A or 408C in FIG. 4 is to attach or embed a Global Positioning Satellite (GPS) receiver in an IBC (not shown in FIG. 7) and then distribute a one pulse per second (1 PPS) output to applicable ANs 412 and IBRs 404.

However, the GPS may not operate effectively in the street level obstructed propagation conditions. An alternative approach to establishing synchronization at the IBC 408 for distribution to ANs 412 or IBRs 404 is to extend a synchronization methodology already in use in the PCN 416.

In some embodiments, the synchronization methodology of the IBCs 408 is Synchronous Ethernet (SyncE). With SyncE, the Network Interface clock frequency of a designated physical port can be precisely applied by the IBCs 408 to any other designated Network Interface physical port. Typically, this is performed by conventional circuitry comprised within the Physical Layer Ports 704 of the IBC 408. With SyncE, the IBC 408 can ensure that the Network Interface clock frequencies at certain physical ports are all identical over time to a master clock frequency typically supplied from within the PCN 416. This is particularly advantageous for network deployments where synchronous applications such as voice or video communications are desired to traverse multiple backhaul links as illustrated, for example, in FIG. 4.

In other embodiments, the synchronization methodology is IEEE 1588v2 or subsequent variations thereof. With IEEE 1588v2, the IBC 408 examines timestamps within certain packets (or frames) to either derive precise timing for internal or local distribution purposes or to modify such timestamps to account for delays traversing the IBC 408 or other network links or elements. Typically, this is performed by conventional circuitry comprised within the IBC Managed Switch 716 and/or Physical Layer Ports 704.

IBRs 404 can also include circuitry for SyncE or IEEE 1588v2 synchronization methodologies. In the SyncE case, the IBC 408 can only pass SyncE clock frequency synchronization from a master clock in the PCN 416 to remote ANs 412 over IBR links to the extent that the IBRs 404 include SyncE capability. In the IEEE 1588v2 case, the IBRs 404 operate across an instant AE-IBR to RE-IBR link as an IEEE 1588v2 transparent clock wherein the timestamp at ingress to such a link (for example, at IBR 404F in FIG. 4) is modified at egress from the link (for example, at IBR 404E in FIG. 4) to account for the actual latency incurred in traversing the link.

Similarly, in some embodiments, the IBC 408 operates as an IEEE 1588v2 transparent clock that modifies timestamps to account for actual latency incurred as a packet traverses from one IBC Network Interface physical port to another. In other embodiments, the IBC 408 alternatively or additionally operates as an IEEE 1588v2 boundary clock that has the ability to determine latency between such an IBC and another IEEE 1588v2 boundary clock or transparent clock device within the network based on delays determined between such devices.

In some embodiments, the IBCs 408 also have the capability to operate as an IEEE 1588v2 master or grandmaster clock as may be directed by the IBMS Agent 724 based on policies or messages passed from an IBMS Private Server 424 or IBMS Global Server 428 as shown in FIG. 4.

As shown in FIG. 7, the IBC 408 includes an IBMS Agent 724. The IBMS agent 724 may be similar to the IBR IBMS Agent 572 shown in and described with respect to FIG. 5 of the present application and shown in and described with respect to FIG. 7 of copending U.S. patent application Ser. No. 13/212,036. The IBMS Agent 724 can be used to set numerous exemplary operational policies or parameters such as, for example, access control, security key management, traffic shaping or prioritization, load balancing, VLAN segmentation, routing paths, port mirroring, port redundancy, failover procedures, synchronization methodologies and port mappings, power management modes, etc. The IBMS Agent 724 can also be used to report numerous operational parameters or statistics to the IBMS Private Server 424 or IBMS Global Server 428, such as, for example, active sessions, connected device identifiers, MAC addresses, packet counts associated with particular MAC addresses or physical ports, packet or frame error rates, transfer rates, latencies, link availability status for certain ports, power consumption for certain ports, power status of the IBC, etc.

In embodiments where a CBR may be utilized for a particular link (not shown in FIG. 4), the IBMS Agent 724 within the IBC 408 can also act as a proxy IBMS Agent for the CBR to the extent the IBC 408 can determine certain operational parameters or statistics or set certain operational parameters or policies for such CBR. Optionally, the IBC 408 may also additionally or alternatively determine or set certain operational parameters or policies for a CBR or a switch port connected to such CBR based on OpenFlow (http://www.openflow.org/), Simple Network Management Profile (SNMP) or other industry standard network element management protocols.

With reference back to FIG. 4, the IBS 400 includes at least one IBMS Server 424, 428 which communicates with IBMS Agents 572, 724 within IBRs 404 and IBCs 408. In many deployments, operators of a PCN 416 may prefer to maintain an IBMS Private Server 424 within the PCN 416. Such an IBMS Private Server 424 typically serves as a secure and private point of database storage and policy management for all IBMS Agents 572, 724 within a particular PCN 416. Typically, such an IBMS Private Server 424 is implemented in a mirrored configuration of two or more substantially conventional servers and databases for both load balancing and redundancy purposes. In some embodiments, the IBMS Private Server 424 is implemented external to the PCN 416, for example as a virtual server and database within the IBMS Global Server 428, but still maintained as a secure and private point within the PCN 416 via a virtual private network (VPN) connection or equivalent technique.

One exemplary capability of the IBMS Private Server 424 includes storing, archiving and indexing data and statistics received from IBMS Agents in IBCs 408 and IBRs 404 associated with a particular PCN 416. An additional exemplary capability of the IBMS Private Server 424 includes generation and/or modification of policies used to configure, manage, optimize or direct, via IBMS Agents, the operation of IBCs 408 and IBRs 404 associated with a particular PCN 416. The IBMS Private Server 424 may also access information from or export information to a Private Database 440.

In some embodiments of the IBMS Private Server 424, certain raw or statistical data related to, for example, IBR operational parameters, are provided to the IBMS Global Server 428. Exemplary IBR operational parameters include channel frequency, modulation and coding scheme (MCS) index, transmit power control (TPC) value, signal to noise ratio (SNR) or signal to noise and interference ratio (SINR), superframe timing parameters, observed interferers, location, antenna configurations, antenna orientations, etc. The IBMS Private Server 424 may also receive policy recommendations for IBRs 404 and IBCs 408 associated with a particular PCN 416 from the IBMS Global Server 428. Such data and/or statistical summaries thereof may be maintained in an IBMS Private Database 432 associated with a particular IBMS Private Server 424.

As shown in FIG. 4, the IBS 400 may also include an IBMS Global Server 428 coupled to the public Internet 444. For IBRs 404 and IBCs 408 deployed in PCNs 416 where an IBMS Private Server 424 is not used, the IBMS Global Server 428 and such IBRs 404 and IBCs 408 can be configured such that the IBMS Global Server 428 provides the capabilities described above for the IBMS Private Server 424 for such IBRs 404 and IBCs 408.

The IBMS Global Server 428 communicates with IBRs 404 and IBCs 408 and IBMS Private Servers 424 such that the IBMS Global Server 428 has access to operational parameters for all IBRs 404 and IBCs 408 across all PCNs 416 capable of interacting with each other, either in network traffic flow or via common access to wireless propagation space.

As also shown in FIG. 4, the IBMS Global Server 428 maintains data associated with the operational parameters of the IBRs 404 (and possibly also IBCs 408) within an IBS 400 in an IBMS Global Database 436. The IBMS Global Server 428 is typically implemented in a mirrored configuration of two or more substantially conventional servers and databases for both load balancing and redundancy purposes. In some embodiments, the IBMS Global Server 428 may be virtualized within a cloud computing cluster that provides on demand server computing resources in response to instantaneous loading of the IBMS Global Server 428.

As shown in FIG. 4, the IBMS Global Server 428 preferably accesses one or more Public Databases 452 over, for example, the public Internet 444. In certain embodiments, the IBMS Global Server 428 accesses data or information in such Public Databases 452 in determining recommended policies for IBRs 404 or IBCs 408 within the IBS 400. In other embodiments, the IBMS Global Server 428 either additionally or alternatively provides data or information to such Public Databases 452 to, for example, enable other radio spectrum users to develop policies in view of deployed IBRs 404 or comply with applicable regulatory requirements. One example of a Public Database 452 is information available within the website of the United States Federal Communications Commission (FCC) at www.fcc.gov for certain fixed service radio locations, antenna orientations, antenna characteristics, transport powers and channel frequencies. Another example of the Public Database 452 is a listing of locations and parameters associated with certain ANs 412, such as WiFi access points. Other examples of Public Databases 452 include Geographic Information Services (GIS) databases of topography, landscape, and building locations and descriptions as may be maintained by various government agencies serving the geographic region encompassed by an exemplary IBS 400.

As also shown in FIG. 4, the IBMS Global Server 428 has the capability to access data or information from or provide data or information to certain Proprietary Databases 448 over the public Internet 444 to the extent that the operator of the IBMS Global Server 428 procures access privileges to such Proprietary Databases 448. Exemplary Proprietary Databases 448 may provide spectrum usage information or detailed GIS data for the geographic region encompassed by an exemplary IBS 400. Alternatively, such Proprietary Databases 448 may be vehicles to monetize data or information provided to such databases by the IBMS Global Server 428.

In certain embodiments where the IBMS Global Server 428 provides data or information to one or more Public Databases 452 or Proprietary Databases 448, some or all these databases may be within the IBMS Global Database 436 of FIG. 4.

The IBMS Global Server 428 of FIG. 4 may also have an analytical capability to determine estimated radio channel propagation effects for deployed or proposed IBR links in view of the other IBR links and other spectrum users within the geographic region encompassed by an exemplary IBS 400. As shown in FIG. 4, an exemplary IBMS Global Server 428 can access either locally or over the public Internet Cloud Computing Resources 456 to execute algorithms associated with such analytical capability. Numerous such algorithms are known. In general, radio channel propagation effects are simulated with such algorithms in view of, for example, radio locations (including antenna height), antenna characteristics and orientations, radio characteristics, channel frequencies and bandwidths, transmit powers, and GIS data describing the propagation environment.

In addition, the IBMS Private Server 424 or IBMS Global Server 428 may also provide traditional FCAPS information. This FCAPS information can be accessed in certain embodiments by the PCN operator by a client in communication with the IBMS Private Server 424 or IBMS Global Server 428. Alternatively or additionally, in other embodiments, such FCAPS information may be exported by the IBMS Private Server 424 or IBMS Global Server 428 to another Network Management System (NMS) as preferred by a particular PCN operator.

In some embodiments, the IBMS Private Server 424 or IBMS Global Service 428 also provides users, such as a particular PCN operator, with the capability to determine additional IBS Components for network changes, moves, adds, or redundancies. This may also be provided via a client interface or via export to another NMS. Typically, the IBMS Private Server 424 or IBMS Global Server 428 considers the particular goal of the IBC network modification, such as for example only, changing the amount of backhaul capacity at a remote location, moving a remote AN 412/IBR 404 to a different location, adding another remote location with one or more ANs, or providing an additional redundancy mechanism at a remote location. In view of the capabilities of the IBMS 420 as described above, then with knowledge of available IBR and IBC product variants or upgrade capabilities, the IBMS Private Server 424 or IBMS Global Server 428, acting as an expert system in exemplary embodiments, then recommends particular additional IBR or IBC equipment or upgrades to realize the requested goal.

In some embodiments, the IBMS Private Server 424 or IBMS Global Server 428 also actively monitors the IBS 400 with the IBMS capabilities described above such that, acting as an expert system in exemplary embodiments, it provides unsolicited recommendations for additional IBR or IBC equipment or upgrades or modified configuration parameters for existing deployed IBRs, IBCs and certain supported CBRs. Typically, for existing deployed IBRs or IBCs that are in communication with the IBMS Private Server 424 or IBMS Global Server 428, such modified configuration parameters associated with either preferential operation or a software-only equipment upgrade can be transferred to the particular IBRs or IBCs over network connections to avoid a need for manual configuration and/or travel by an operator to the remote location. Optionally, such an IBMS Server 424, 428 may also link to a commerce server or application to invoice as appropriate for such upgrades.

In some embodiments, the IBMS Private Server 424 or IBMS Global Server 428 generates a configuration file or list of configuration settings for any additional IBRs or IBCs or upgraded IBRs or IBCs in view of the overall IBS network deployment and IBMS capabilities described above. In some exemplary embodiments, such a configuration file or list is supplied via email or network connection to an installer of the IBR or IBC for initial deployment provisioning using a console mode terminal either wireline connected to the instant IBR or IBC or wirelessly (i.e. WiFi) connected to the IBR or IBC. Alternatively or additionally, other exemplary embodiments allow network discovery between the instant IBR or IBC being provisioned upon deployment and the IBMS Private Server 424 or IBMS Global Server 428 such that the initial provisioning configuration can be transferred to the IBR or IBC without manual configuration.

Although FIGS. 3-7 and the descriptions thereof herein depict the IBC 408 as a separate network element from that of the IBR 404, this is not an absolute requirement for all embodiments of an IBS 400. In some exemplary embodiments, it may be advantageous to integrate some or all of the IBC functionality described herein within a single physical entity of the IBR 404. Alternatively, in other exemplary embodiments, it may be advantageous to utilize separate physical enclosures respectively for the IBR 404 and IBC 408 such that an IBC physical entity can directly attach to an IBR physical entity without separate mounting or cables. Such IBC/IBR combinations may maintain multiple physical network interface ports for connection to one or more ANs and one or more additional IBRs without combined or attached IBC.

In some IBS deployment scenarios, CBR links may be used in addition to or alternatively to the IBR links shown in FIG. 4. For such situations, certain IBC deployments may serve as a proxy between such a CBR and the IBMS Private Server 424 or IBMS Global Server 428 such that the IBMS Agent in such IBC 408 provides operational parameters for the CBR link regarding throughput or congestion. This optional capability provides additional information to the IBMS Private Server 424 or IBMS Global Server 428 on which to base its recommendations for configurations of IBRs 400 and IBCs 408 within the IBS 400 or to modify policies at such IBRs 404 and IBCs 408. Alternatively, the IBMS Private Server 424 or IBMS Global Server 428 may determine such information and set such operational parameters for either CBRs or other network elements including routers and switches via OpenFlow or other such industry standard network management protocols.

In exemplary IBCs 408, network traffic shaping and classifying is based on policies that may be updated by the IBMS Private Server 424 or IBMS Global Server 428 via the IBMS Agent at the IBC 408 as described above. This is advantageous to the PCN operator because such policies can reflect or enforce provisions of Service Level Agreements (SLAs) for backhaul between certain ANs and elements within the PCN. For example, an SLA may require minimum throughput at all times to or from certain ANs with simultaneous maximum latencies for such traffic for certain traffic types. The IBMS Private Server 424 or IBMS Global Server 428 can translate such SLA requirements to policies that can be set at a given IBC 408 or IBR 404. To the extent that traffic contention occurs at an IBC 408 due to finite switching bandwidth or IBR backhaul capacity, the IBMS Agent may further set policies on the order in which one or more SLA requirements is violated. Similarly, to the extent that spectrum resource contentions in a local geographic area amongst the IBR (or CBR) links under IBMS Private Server 424 or IBMS Global Server 428 management causes one or more SLA requirements to be violated, the order in which traffic is controlled or spectrum access restricted may be set via policies communicated to the IBMS Agents 572, 624 of affected IBCs 408 or IBRs 404. In the above examples, the IBMS Private Server 424 or IBMS Global Server 428 may also set such policies in view of minimizing financial penalties to the PCN operator in situations where SLA requirements are violated.

In exemplary embodiments, the IBS 400 provides redundant backhaul paths from certain ANs 412 to elements within the PCN 416 as depicted, for example, at IBC 408A in FIG. 4. In one example, as shown in FIG. 4, IBC 408A may direct traffic to or from the one or more ANs 412 via redundant IBRs 404 as shown. The instantaneous switching of AN traffic to the two or more IBRs 404 in a redundancy configuration can be set by policies at the IBC 408. The policies can be updated via the IBMS Agent at the IBC 408 in communication with the IBMS Private Server 424 or IBMS Global Server 428. Such policies can include designation of redundancy order amongst multiple IBRs 404 connected to a particular IBC 408 in case an IBC port condition indicates an IBR equipment or link failure or link conditions degraded past a threshold and load balancing parameters amongst available IBR links at an IBC 408. One load balancing strategy that may be deployed via policies at the IBC 408 in communication with IBMS elements is to uniformly distribute all classes of AN traffic amongst available IBRs 404. An alternate load balancing strategy in view of overall IBS operation as determined via the IBMS Private Server 404 or IBMS Global Server 428 and communicated policies to the IBMS Agent 724 of the IBC 408 may be to direct no traffic or only certain classes of traffic to particular IBR links on particular IBC network interface ports. Numerous other redundancy, load balancing, path routing and fail-over strategies are also possible.

In certain exemplary embodiments, an IBC 408 may also be directed via IBMS elements to localize traffic amongst ANs 412 using, for example, MPLS. Alternatively, an IBC 408 may be directed to preferentially choose certain MPLS paths or IP routes based on network congestion as communicated to its IBMS Agent based on determination of congestion at either an IBMS Server or other network element from IBMS Agent messages or other method such as OpenFlow.

In some embodiments, the IBMS Private Server 424 or IBMS Global Server 428 acts as an RF spectrum coordinator for an IBS 400 within a given geographic region. For example, an exemplary IBMS Private Server 424 or IBMS Public Server 428 with the capabilities described herein may communicate policies or configuration parameters to some or all IBRs 404 in an IBS 400 such that each IBR 404 is directed to use or instructed to favor operation at particular channel frequency, channel bandwidth, antenna selection or overall radiation orientation, or within a maximum transmit power level. Such policies or configuration parameters may be determined at exemplary embodiments of the IBMS Private Server 424 or IBMS Global Server 428 in view of measured data at various IBRs 404 as reported via respective IBMS Agents and alternatively or additionally in view of RF propagation modeling using available database and computing resources. For example, in the exemplary IBS 400 shown in FIG. 4, the RF links between IBRs 404D and 404B and IBRs 404A and 404C may contend for common RF spectrum resources. To the extent that the exemplary IBMS Private Server 424 or IBMS Global Server 428 determines that such contention is not sufficiently mitigated by the affected IBRs 404 under their current policies and configuration parameters in view of, for example, measured data, interference cancellation capabilities, antenna selections, characteristics and orientations, simulated propagation effects, traffic conditions, applicable SLAs, etc., then such exemplary IBMS Private Server 424 or IBMS Global Server 428 may send updated policies or configuration parameters to one or more affected IBRs 404 via their IBMS Agents. In such an example, this may cause such IBRs 404 to use or favor usage of a particular RF channel frequency or sub-band of frequencies, to use a different channel bandwidth, to avoid certain antenna selections or orientations, or to restrict operation to a specified maximum transmit power level. In exemplary embodiments, the foregoing process may also consider interference from non-IBR users of the same RF spectrum, such as CBRs, or interference to other users of the instant RF spectrum as may be required under certain spectrum regulations.

In some embodiments, the IBMS Private Server 424 or IBMS Global Server 428 acts as a topology coordinator for an IBS 400 within a given geographic region typically in conjunction with RF spectrum coordinator capability described above. For example, an exemplary IBMS Private Server 424 or IBMS Global Server 428 with the capabilities described herein may communicate policies or configuration parameters to some or all IBRs 404 in an IBS 400 such that each IBR 404 is directed to associate or instructed to favor association with certain other designated IBRs 404. Such policies or configuration parameters may be determined at exemplary embodiments of the IBMS Private Server 424 or IBMS Global Server 428 in view of reported traffic flows at certain IBC network interface ports or over certain IBR links, reported link performance metrics at certain IBRs, instant interference and RF spectrum coordination considerations, desired redundancy, fail-over or load balancing goals, and applicable SLA requirements including, for example, localized network congestion or access cost considerations. For example, in the IBS 400 shown in FIG. 4, IBR 404A is shown as associated with IBR 404C, IBR 404D is shown as associated with IBR 404B, IBR 404E is shown as associated with IBR 404F, and IBR 404K is shown as associated with IBR 404G. However, based on reported measurement data or RF propagation modeling, the IBMS Private Server or IBMS Global Server may also determine that IBRs 404A and 404D can alternatively associate with IBR 404C or 404F, IBR 404E can alternatively associate with IBR 404C or 404G, and IBR 404K can alternatively associate with IBR 404F or IBR 404H. In such potential association scenarios, the exemplary topology coordinator at an IBMS Private Server 424 or IBMS Public Server 428 can change policies or configuration parameters for such IBRs enumerated above in reference to FIG. 4 such that such IBRs are forced to associate differently or given an option to associate differently as a localized decision based on certain adverse network conditions such as interference or link failure.

For embodiments in which the IBMS Private Server 424 or IBMS Global Server 428 acts as a topology coordinator, such capability may also additionally or alternatively extend to IBC internal topology characteristics such as VLAN port mapping, MPLS routing paths, distribution of traffic to redundant IBR links, etc. again in view of desired redundancy, fail-over or load balancing goals, and applicable SLA requirements including, for example, localized network congestion or access cost considerations.

As described in copending U.S. patent application Ser. No. 13/212,036, some IBR embodiments use fixed superframe timing parameters. Particularly for Time-Division Duplex (TDD) fixed superframe operation, the relationship between start and end of transmission timing in any given link direction to other such transmissions by other IBR links in nearby geographic proximity can greatly affect both the amount of interference experience by such links and The effectiveness of interference cancellation techniques at receiving IBRs.

In some embodiments, particularly for situations where TDD fixed superframe timing IBR links are deployed, the IBMS Private Server 424 or IBMS Global Server 428 acts as a superframe timing coordinator for an IBS 400 within a given geographic region typically in conjunction with the RF spectrum coordinator and topology coordinator capabilities described above. For example, an exemplary IBMS Private Server 424 or IBMS Global Server 428 with the capabilities described herein may communicate policies or configuration parameters to some or all IBRs 404 in an IBS 400 such that each IBR 404 is directed to use or to favor the use of certain superframe timing parameters such as uplink/downlink duty cycle and superframe timing offset relative to a global timing reference or current local timing reference. Such policies and configuration parameters may be determined at exemplary embodiments of the IBMS Private Server 424 or IBMS Global Server 428 in view of similar considerations described above for the RF spectrum coordinator and topology coordinator capabilities. For example, in the IBS 400 shown in FIG. 4, any IBRs described above as capable of associating with multiple other IBRs, such as IBR 404D can associate with IBRs 404B, 404C or 404F, are likely to also cause meaningful interference at any such IBRs not presently associated with. Thus if co-channel operation is required then advantageously the exemplary superframe timing coordinator capability of an IBMS Private Server 424 or IBMS Global Server 428 would set superframe timing related polices or configuration parameters to minimize the impacts of such interference as measured or calculated. Alternatively or additionally, the superframe timing coordinator capability is invoked in conjunction with the RF spectrum coordinator and topology coordinator capabilities such that if acceptable IBR link performance is deemed unachievable by superframe timing changes then changes to policies or configurations parameters for RF spectrum or topology may be invoked by the IBMS Private Server 424 or IBMS Global Server 428.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the present invention. The term "computer-readable medium" shall accordingly be taken to include, but not be limited to, solid-state memories, and optical and magnetic media.

Embodiments of the invention have been described through functional modules at times, which are defined by executable instructions recorded on computer readable media which cause a computer, microprocessors or chipsets to perform method steps when executed. The modules have been segregated by function for the sake of clarity. However, it should be understood that the modules need not correspond to discreet blocks of code and the described functions can be carried out by the execution of various code portions stored on various media and executed at various times.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The invention has been described in relation to particular examples, which are intended in all respects to be illustrative rather than restrictive. Those skilled in the art will appreciate that many different combinations of hardware, software, and firmware will be suitable for practicing the present invention. Various aspects and/or components of the described embodiments may be used singly or in any combi-

What is claimed is:

1. An intelligent backhaul system comprising:
a plurality of intelligent backhaul radios, wherein a first intelligent backhaul radio of said plurality of intelligent backhaul radios comprises:
a plurality of receive RF chains;
one or more transmit RF chains;
an antenna array comprising a plurality of directive gain antenna elements, wherein each directive gain antenna element is couplable to at least one receive RF chain or transmit RF chain;
a radio resource controller, wherein the radio resource controller sets or causes to be set a certain RF carrier frequency or channel bandwidth for at least one receive RF chain or transmit RF chain;
an intelligent backhaul management system agent coupled to the radio resource controller, wherein said intelligent backhaul management system agent sets or causes to be set certain operational parameters, wherein at least one of said certain operational parameters relates to said certain RF carrier frequency or channel bandwidth for at least one receive RF chain or transmit RF chain, and wherein said intelligent backhaul management system agent is in communication with a server configured to manage or control the first intelligent backhaul radio, and wherein said communication provides for a determination of the certain operational parameters based upon service level agreement requirements stored at the server.

2. The intelligent backhaul system of claim 1, further comprising:
a first intelligent backhaul controller, wherein the first intelligent backhaul controller provides a synchronization reference for the first intelligent backhaul radio, wherein said certain operational parameters relate to a synchronization methodology associated with said synchronization reference, said first intelligent backhaul controller comprising:
a plurality of network interfaces;
a host controller; and
a first managed switch coupled to the plurality of network interfaces; and,
wherein said first intelligent backhaul radio further comprises:
a media access controller to exchange data to and from a data network via coupling to at least the first managed switch and to and from at least a second intelligent backhaul radio of said plurality of intelligent backhaul radios.

3. The intelligent backhaul system of claim 2, further comprising a second intelligent backhaul controller which provides a synchronization reference for the second intelligent backhaul radio, and wherein the second intelligent backhaul controller comprises a second managed switch.

4. The intelligent backhaul system of claim 3, wherein the second intelligent backhaul controller further functions as an IEEE1588v2 boundary clock.

5. The intelligent backhaul system of claim 3, wherein the second intelligent backhaul controller utilizes said exchange of data to and from said first intelligent backhaul radio to provide said synchronization reference.

6. The intelligent backhaul system of claim 5, wherein said second intelligent backhaul controller operates as an IEEE 1588v2 boundary clock that has the ability to determine latency between the second intelligent backhaul controller and another IEEE 1588v2 boundary clock or transparent clock device within the network based on delays determined between such devices.

7. The intelligent backhaul system of claim 6, wherein said first intelligent backhaul controller comprises said another IEEE 1588v2 boundary clock or transparent clock device within the network.

8. The intelligent backhaul system of claim 4, wherein the second intelligent backhaul controller comprises at least one network port, and further wherein said second intelligent backhaul controller further functions as an IEEE1588v2 boundary clock relative to said at least one network port.

9. The intelligent backhaul radio of claim 1, wherein the intelligent backhaul management system agent in the first intelligent backhaul radio exchanges information with other intelligent backhaul management system agents within other radios of the plurality of intelligent backhaul radios or with the server.

10. The intelligent backhaul radio of claim 1, wherein the intelligent backhaul management system agent reports operational parameters to the server.

11. The intelligent backhaul radio of claim 1, wherein one or more of the plurality of operational parameters comprise channel frequency, channel bandwidth, antenna selection, radiation orientation and maximum transmit power.

12. A server comprising:
memory; and
a processor configured to manage or control a plurality of intelligent backhaul radios, wherein the processor stores data received from the plurality of intelligent backhaul radios in the memory, stores operational parameters used to configure, manage and control the plurality of intelligent backhaul radios in the memory, and generates operational parameters for at least one of the plurality of intelligent backhaul radios, wherein said operational parameters are based upon or derived from service level agreement requirements, and wherein said operational parameters include one or more of a channel frequency parameter, a modulation and coding scheme (MCS) index parameter, a transmit power control (TPC) value, a signal to noise ratio (SNR) or signal to noise and interference ratio (SINR), a superframe timing parameter, an observed interferer parameter, a location parameter, an antenna configuration parameter, and an antenna orientation parameter.

13. The server of claim 12, wherein the processor is configured to be a topology coordinator.

14. The server of claim 13, wherein said topology coordinator is further involved in the configuration of synchronization methodologies.

15. The server of claim 14, wherein said synchronization methodology operates according to the IEEE1588v2 standard.

16. The server of claim 15, wherein said server provides for the configuration of said operational parameters associated with a first and a second intelligent backhaul radio such that a boundary clock functionality is provided at said second backhaul radio based upon estimated timing delays from said first intelligent backhaul radio.

17. The server of claim 12, wherein the processor analyzes information related to one or more of traffic flows, performance metrics, interference and RF spectrum coordination parameters, redundancy and fail-over and load balancing.

18. The server of claim 17, wherein the processor further modifies polices used to configure, manage and control the plurality of intelligent backhaul radios.

19. The server of claim 12, wherein the processor further generates a configuration file for at least one of the plurality of intelligent backhaul radios.

20. The server of claim 12, wherein the processor further determines network traffic shaping and classifying policies for at least one of the plurality of intelligent backhaul radios.

21. The server of claim 12, wherein the processor further enforces provisions of service level agreements.

22. The server of claim 12, wherein the server is at least one of a private server and a global server.

23. The server of claim 12, wherein the processor is further configured to be a superframe timing coordinator.

24. The intelligent backhaul system of claim 1, wherein the first intelligent backhaul radio determines at least one of the certain operational parameters based upon said communication with said server.

25. The intelligent backhaul system of claim 1, wherein the first intelligent backhaul radio receives the certain operational parameters utilizing said communication with the server, wherein the server determines at least one of the certain operational parameters.

26. The intelligent backhaul system of claim 1, wherein at least one intelligent backhaul radio comprises an intelligent backhaul controller.

27. The intelligent backhaul system of claim 2, wherein the first intelligent backhaul radio comprises the first intelligent backhaul controller.

* * * * *